United States Patent
Vieira et al.

(10) Patent No.: US 12,468,291 B2
(45) Date of Patent: Nov. 11, 2025

(54) SOFTWARE DEFINED MANUFACTURING IN A CELLULAR NETWORK

(71) Applicant: Telefonaktiebolaget LM Ericsson (publ), Stockholm (SE)

(72) Inventors: Elvis Vieira, Ottawa (CA); Edwin Iun, Ottawa (CA); Rajesh Dawadi, Ottawa (CA); Tian Tian, Toronto (CA); Luwan Wang, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 467 days.

(21) Appl. No.: 17/630,185

(22) PCT Filed: Jul. 30, 2020

(86) PCT No.: PCT/IB2020/057218
§ 371 (c)(1),
(2) Date: Jan. 26, 2022

(87) PCT Pub. No.: WO2021/024113
PCT Pub. Date: Feb. 11, 2021

(65) Prior Publication Data
US 2022/0283571 A1  Sep. 8, 2022

Related U.S. Application Data

(60) Provisional application No. 62/882,261, filed on Aug. 2, 2019.

(51) Int. Cl.
*G05B 19/418* (2006.01)
(52) U.S. Cl.
CPC ... *G05B 19/41855* (2013.01); *G05B 19/4186* (2013.01); *G05B 19/41865* (2013.01)

(58) Field of Classification Search
CPC ......... G05B 19/41855; G05B 19/4186; G05B 19/41865; G05B 2219/32252; G05B 13/042
See application file for complete search history.

(56) References Cited

U.S. PATENT DOCUMENTS 6,801,949 B1 * 10/2004 Bruck ................. H04L 61/25
709/234
7,323,991 B1 * 1/2008 Eckert ................. G07C 9/28
235/382

(Continued)

FOREIGN PATENT DOCUMENTS

CN         1591250 A      3/2005
CN       102299912 A     12/2011

(Continued)

OTHER PUBLICATIONS

Svrcek, W. et al., "A Real-Time Approach to Process Control", Third Edition, Wiley, Chapter 4, 2014 (26 pages).

(Continued)

*Primary Examiner* — Nicholas Klicos
(74) *Attorney, Agent, or Firm* — Rothwell, Figg, Ernst & Manbeck, P.C.

(57) ABSTRACT

Embodiments of a system including at least one access node configured to wirelessly transmit and receive signals to and from industrial devices within at least two cells of a cellular communications network deployed within a manufacturing facility; and a computer system. The computer system includes an interface connected to transmit and receive signals to and from the access node; and processing circuitry configured to: define a manufacturing process instance, MPI, identifying manufacturing operations necessary to perform a predetermined manufacturing process; allocate one of more of the industrial devices to the MPI, each allocated industrial device configured to perform at least one of the identified (Continued)

manufacturing operations; and implement an Controller configured to control each of the industrial devices allocated to the MPI to cooperatively perform the predetermined manufacturing process.

12 Claims, 24 Drawing Sheets

(56) References Cited

U.S. PATENT DOCUMENTS

| | | | |
|---|---|---|---|
| 10,139,811 B2 | 11/2018 | Lawson | |
| 10,203,679 B2 | 2/2019 | Mckelvey | |
| 2007/0220519 A1* | 9/2007 | Koike | G06F 9/542 |
| | | | 718/102 |
| 2009/0075654 A1 | 3/2009 | Lu et al. | |
| 2009/0086692 A1* | 4/2009 | Chen | H04L 67/12 |
| | | | 370/338 |
| 2010/0057236 A1* | 3/2010 | Reggio | G06Q 10/06 |
| | | | 700/100 |
| 2010/0271989 A1* | 10/2010 | Chernoguzov | H04W 8/005 |
| | | | 370/310 |
| 2013/0176115 A1* | 7/2013 | Puleston | G06F 1/266 |
| | | | 340/10.51 |
| 2015/0071139 A1* | 3/2015 | Nix | H04L 9/3066 |
| | | | 370/311 |
| 2015/0277399 A1* | 10/2015 | Maturana | G06F 9/5072 |
| | | | 700/29 |
| 2015/0277407 A1 | 10/2015 | Vanderkoy | |
| 2015/0316922 A1* | 11/2015 | Rischar | G05B 19/41855 |
| | | | 700/23 |
| 2015/0316923 A1* | 11/2015 | Strilich | H04L 67/12 |
| | | | 700/11 |
| 2016/0048712 A1* | 2/2016 | Butler | G06K 7/10198 |
| | | | 340/10.51 |
| 2017/0277173 A1* | 9/2017 | Bonomi | G06Q 50/04 |
| 2018/0088548 A1* | 3/2018 | Sangi | G05B 13/021 |
| 2018/0146439 A1* | 5/2018 | Kim | H04W 52/325 |
| 2018/0262573 A1 | 9/2018 | Przybylski | |
| 2018/0299873 A1 | 10/2018 | Chauvet et al. | |
| 2019/0105226 A1 | 4/2019 | Potucek | |
| 2019/0173620 A1* | 6/2019 | Oh | H04L 1/1822 |
| 2019/0190635 A1* | 6/2019 | Goel | H04W 56/001 |
| 2020/0260415 A1* | 8/2020 | Li | H04L 1/1812 |

FOREIGN PATENT DOCUMENTS

| | | |
|---|---|---|
| CN | 107643735 A | 1/2018 |
| CN | 108885560 A | 11/2018 |
| WO | 2020/167222 A2 | 8/2020 |

OTHER PUBLICATIONS

A. Zoitl, V. Vyatkin, "IEC 61499 Architecture for Distributed Automation: the 'Glass Half Full' View", IEEE Industrial Electronics Magazine, 3(4), pp. 7-23, doi:10.1109/MIE.2009.934789, 2009.
Ericsson et al., "Industry 4.0—Connectivity is the foundation", Ericsson, Abb.
IEC, "Programmable controllers—Part 8: Guidelines for the application and implementation of programming languages", IEC TR 61131-8, Second edition, Sep. 2003.
N. T. Dantam et al., "The Task-Motion Kit", IEEE Robotics & Automation Magazine, Digital Object Identifier 10.1109/MRA.2018.2815081, Sep. 2018.
ROS—Industrial Tutorials Overview, This tutorial describes how to create and arm navigation package, Wiki: Industrial/Tutorials (last edited May 27, 2018 11:14:25 by GvdHoorn (/GvdHoorn)), Open Source Robotics Foundations.
ROS—Industrial, ROS—Industrial is an open source project that extends the advanced capabilities of the Robot Operating System (ROS) software to manufacturing.
S. Mitsi et al., "Off-line programming of an industrial robot for manufacturing", Int J Adv Manuf Technol (2005) 26: 262-267, DOI 10.1007/s00170-003-1728-5, Springer-Verlag London, Sep. 10, 2004.
S. Srivastava et al., "Combined Task and Motion Planning Through an Extensible Planner-Independent Interface Layer", Computer Science Division, University of California, Berkeley CA 94720. http://www.cs.berkeley.edu/%7Esiddharth/icra14.
Unknown, "Next Generation Private Mobile Networks Industry 4.0",, Oct. 28, 2020, pp. 1-19. https://www.theiet.org/media/2597/dense-air.pdf.
W. Y. Svrcek et al., "A Real-Time Approach to Process Control, 3rd Edition", Wiley, ISBN: 978-1-119-99387-2, Feb. 2014.
International Search Report and Written Opinion issued on Applicant's corresponding application PCT/IB2020/057218.
D. Patel et al., "5G meets Time Sensitive Networking," Ericsson Blog, Dec. 18, 2018 (pp. 1-6).

* cited by examiner

SOFTWARE DEFINED MANUFACTURING IN A CELLULAR NETWORK

TECHNICAL FIELD

The present disclosure relates to industrial automation, and in particular to Software Defined Manufacturing (SDM) in a cellular network.

BACKGROUND

Industry 4.0 is a term that has been used to describe current trends of automation and data exchange in manufacturing technologies. This so-called fourth industrial revolution has the potential to significantly boost productivity, reduce costs and improve product quality. Essentially, Industry 4.0 aims to enable fine control of the production at every step of the process, therefore improving quality. It also helps to reduce and even eliminate downtime, because data supplied by manufacturing equipment (such as industrial robots) can be used to schedule maintenance or predict breakdowns.

While Industry 4.0 encompasses a range of goals and desired results, there is currently no reference architecture defining how industrial systems may be organized and operated to achieve these goals.

The International Electrotechnical Commission (IEC) has published various standards related to automated manufacturing systems. For example, IEC 61131-3 is the third part of the open international standard IEC 61131 for programmable logic controllers (PLCs). The current (third) edition was published in February 2013, and details the basic software architecture and programming languages of the control program within a PLC. It defines three graphical and two textual programming language standards as follows:

Ladder Diagram (LD);
Function Block Diagram (FBD);
Structured Text;
Sequential Function Chart (SFC); and
Instruction List (IL), deprecated.

IEC 61499, was initially published in 2005, and addresses the topic of function blocks for industrial process measurement and control systems. This specification defines a generic model for distributed control systems and is based on the IEC 61131 standard.

While the IEC standards provide functional blocks that may be used for automated control of industrial systems, they do not address the system performance requirements needed to implement the concepts of Industry 4.0

SUMMARY

Aspects of the present invention provide a system comprising: at least one access node configured to wirelessly transmit and receive signals to and from industrial devices within at least two cells of a cellular communications network deployed within a manufacturing facility; and a computer system comprising: an interface connected to transmit and receive signals to and from the access node; and processing circuitry configured to: define a manufacturing process instance, MPI, identifying manufacturing operations necessary to perform a predetermined manufacturing process; allocate one or more of the industrial devices to the MPI, each allocated industrial device configured to perform at least one of the identified manufacturing operations; and implement an Controller configured to control each of the industrial devices allocated to the MPI to cooperatively perform the predetermined manufacturing process.

Embodiments of a base station, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

Figure 1A:
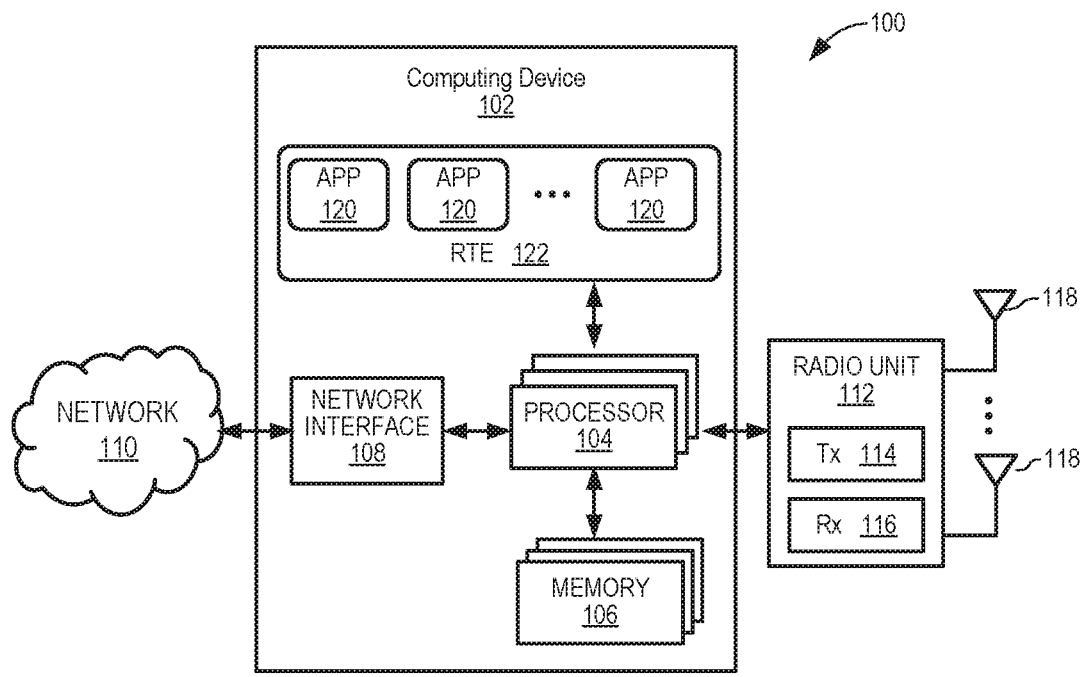
FIGS. 1A and 1B are block diagrams illustrating computing devices usable in embodiments of the present invention.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

3GPP 3rd Generation Partnership Project
CFCP Coarse and Fine Control Protocol
CIP Common Industrial Protocol
CLGC Closed-loop Gain Control
CLC Closed Loop Control
CP Cyclic Prefix
CQI Channel Quality Indicator
DL Downlink
EPC Evolved Packet Core
ETSI European Telecommunications Standard Institute
FBD Functional Block Diagram
GTP GPRS Tunneling Protocol
HMI Human Machine Interface
14.0 Industry 4
IEC International Electrotechnical Commission
ISO International Organization for Standardization
IEEE Institute of Electrical and Electronics
IP Internet Protocol
IRT Isochronous Real-Time
MAC Medium Access Control
MPI Manufacturing Process Instance
PDCP Packet Data Convergence Protocol
PID Proportional Integral Derivative
PRB Physical Resource Block
PROFINET Process Field Net—an industry standard for data communication over industrial ethernet
PUCCH Physical Uplink Control Channel
QA Quality Assurance
QCI QoS Class Indicator
QoS Quality of Service
QAM Quadrature Amplitude Modulation
QPSK Quadrature Phase Shift Keying
RB Resource Block
RE Resource Element
ROS Robot Operating System
RLC Radio Link Control
RS Reference Symbol
RT Real-Time
SCTP Stream Control Transmission Protocol
SDM Software Defined Manufacturing
SFN System Frame Number
SIB System Information Block
SR Scheduling Request
TCP Transmission Control Protocol
TMP Task-Motion Planning
UE User Equipment
URLLC Ultra-Reliable Low-Latency Communication
UTC Coordinated Universal Time
VGP Variable Gain Process Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018 March), for example) should be understood to refer to the specific version(s) of such standard(s) that is(were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

Figure 1B:
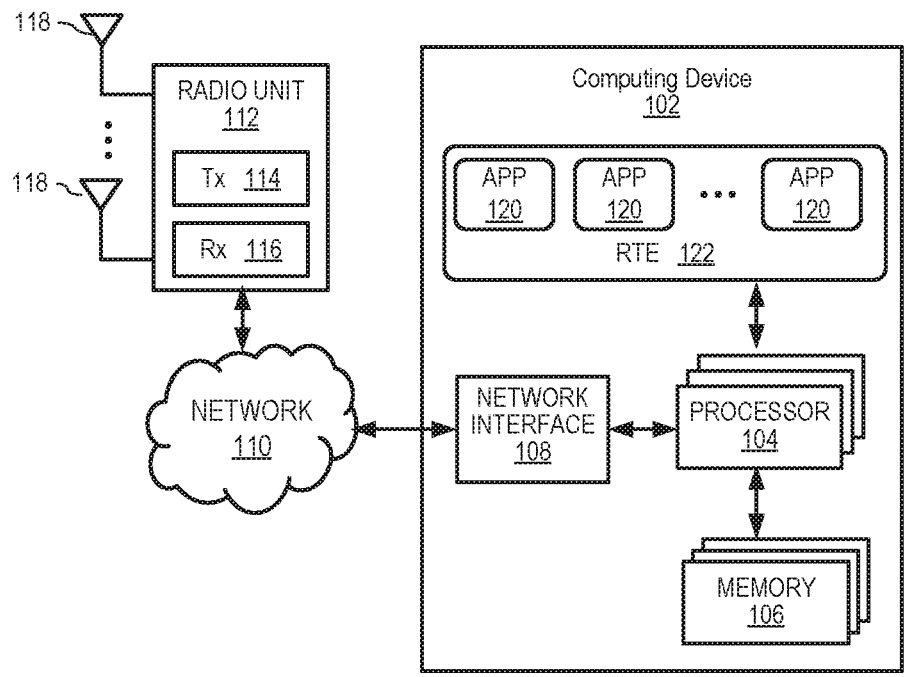

FIGS. 1A and 1B is a block diagram schematically illustrating a communications system 100 including a computing device 102 usable in embodiments of the present invention.

In the example of FIG. 1A, the communications system 100 generally includes computing device 102 connected to one or more networks 110 and one or more radio units 112. The computing device 102 includes one or more processors 104, a memory 106, one or more network interfaces 108. The processors 104 may be provided as any suitable combination of microprocessors (pPs), Central Processing Units (CPUs), Application Specific Integrated Circuits (ASICs), Field Programmable Gate Arrays (FPGAs), or the like. Similarly, the memory 106 may be provided as any suitable combination of Random Access Memory (RAM), Read Only Memory (ROM) and mass storage technologies such as magnetic or optical disc storage or the like. The network interfaces 108 enable signaling between the computing device 102 and the networks 110, such as a core network (not shown), a data network (not shown), or a private domain network such as a data center (not shown).

Each radio unit 112 typically includes at least one transmitter (Tx) 114 and at least one receiver (Rx) 116 coupled to one or more antennas 118. In the example of FIG. 1A, the radio unit(s) 112 is(are) shown as being external to the computing device 102 and connected to the computing device 102 via a suitable physical connection (such as a copper cable or an optical cable). In the example of FIG. 1B, the radio unit(s) 112 is(are) shown as being connected to computing device 102 via a network 110 and a network interface 108. In still other embodiments, the radio unit(s) 112 and optionally also the antenna(s) 118 may be integrated together with the computing device 102.

The one or more processors 104 operate to provide functions of the computing device 102. Typically, these function(s) are implemented as software applications (APPs) 120 or modules that are stored in the memory 106, for example, and executed by the one or more processors 104. In some embodiments, one or more software applications or modules 120 may execute within a secure run-time environment (RTE) 122 maintained by an operating system (not shown) of the computing device 102.

It may be appreciated that specific embodiments may exclude one or more of the elements illustrated in FIGS. 1A and 1B. For example, a computing device 102 configured to implement a wireless device of a radio access network may incorporate one or more processors 104, a memory 106, and one or more radio units 112, but may exclude a network interface 108. Conversely, a computing device 102 configured to implement a server in a core network, for example, may include one or more processors 104, a memory 106, and one or more network interfaces 108, but may exclude radio units 112. A computing device 102 configured to implement a base station of a radio access network, on the other hand, will normally include one or more processors 104, a memory 106, and both radio units 112 and network interfaces 108.

Figure 2:
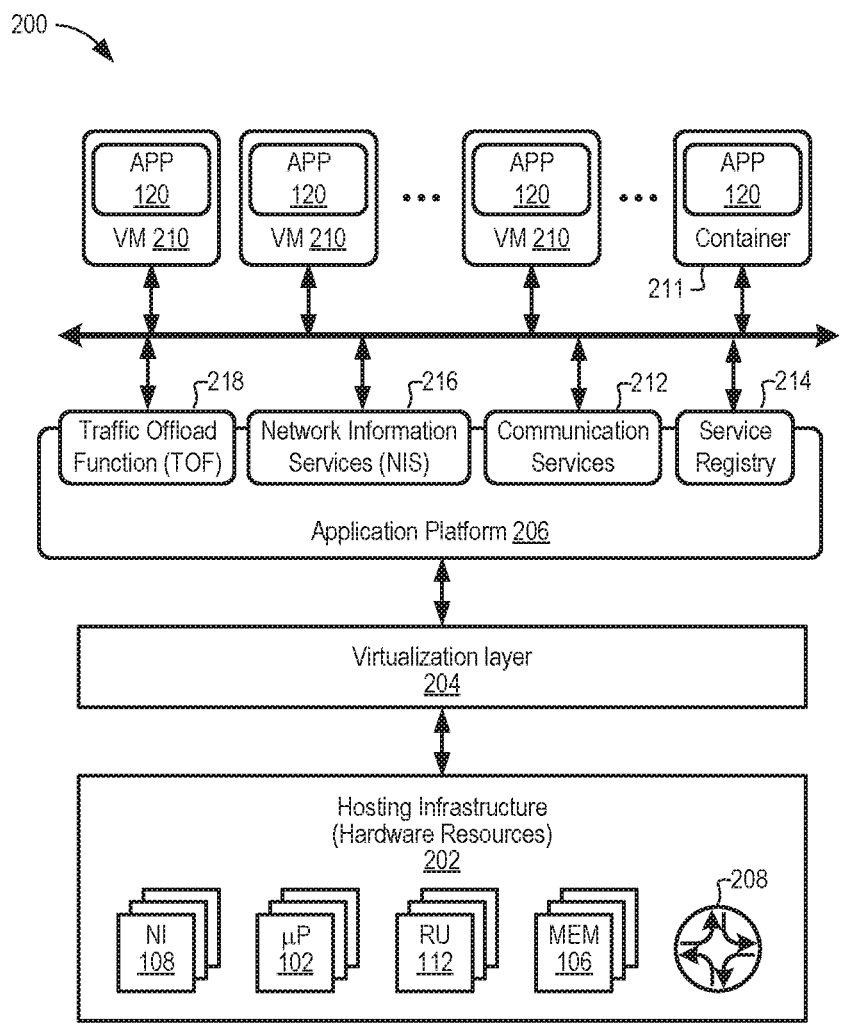
FIG. 2 is a block diagram illustrating virtualization.

FIG. 2 is a block diagram schematically illustrating an example architecture 200 for system virtualization usable in embodiments of the present invention. It is contemplated that computing systems may be physically implemented using one or more computing devices (any or all of which may be constructed in accordance with the system 100 described above with reference to FIG. 1) interconnected together and executing suitable software to perform its intended functions. Those of ordinary skill will recognize that there are many suitable combinations of hardware and software that may be used for this purpose, which are either known in the art or may be developed in the future. For this reason, a figure showing physical hardware components and connections is not included herein.

As maybe seen in FIG. 2, the illustrated architecture 200 generally comprises hosting infrastructure 202, a virtualization layer 204 and an Application Platform Services layer 206. The hosting infrastructure 202 comprises physical hardware resources provided by the infrastructure on which the architecture 200 is being implemented. These physical hardware resources may include any or all of the processors 104, memory 106, network interfaces 108 and radio units 112 described above with reference to FIG. 1, and may also include traffic forwarding and routing hardware 208. The virtualization layer 204 presents an abstraction of the hardware resources 202 to the Application Platform Services layer 206. The specific details of this abstraction will depend on the requirements of the applications 120 being hosted by the Application Platform Services layer 206. Thus, for example, an APP 120 that provides traffic forwarding functions may be presented with an abstraction of the hardware resources 202 (e.g. processor(s) 104, memory 106 and traffic forwarding hardware 208) that simplifies the implementation of traffic forwarding policies. Similarly, an application that provides data storage functions may be presented with an abstraction of the hardware resources 202 (e.g. processor(s) 104 and memory 106) that facilitates the storage and retrieval of data (for example using Lightweight Directory Access Protocol—LDAP).

The application platform 206 provides the capabilities for hosting applications. In some embodiments, the application platform 206 supports a flexible and efficient multi-tenancy run-time and hosting environment for applications 120 by providing Infrastructure as a Service (IaaS) facilities. In operation, the application platform 206 may provide a security and resource "sandbox" for each application 120 being hosted by the platform 206. Each "sandbox" may be implemented as a Virtual Machine (VM) image 210 that may include an appropriate operating system and controlled access to (virtualized) hardware resources 202. Alternatively, each "sandbox" may be implemented as a container 211 that may include appropriate virtual memory and controlled access to a host operating system and (virtualized) hardware resources 202. The application platform 206 may also provide a set of middleware application services and infrastructure services to the applications 120 hosted on the application platform 206, as will be described in greater detail below.

Applications 120 from vendors, service providers, and third-parties may be deployed and executed within a respective Virtual Machine 210. Communication between applications 120 and services of the application platform 206 may conveniently be designed according to the principles of Service-Oriented Architecture (SOA) known in the art.

Communication services 212 may allow applications 120 to communicate with the application platform 206 (through pre-defined Application Programming Interfaces (APIs) for example) and with each other (for example through a service-specific API).

A Service registry 214 may provide visibility of the services available on the server 200. In addition, the service registry 214 may present service availability (e.g. status of the service) together with the related interfaces and versions. This may be used by applications 120 to discover and locate end-points for the services they require, and to publish their own service end-point(s) for other applications to use.

Network Information Services (NIS) 216 may provide applications 120 with low-level network information pertaining to a network service instance or one or more Protocol Data Unit (PDU) sessions, for example.

A Traffic Off-Load Function (TOF) service 218 may prioritize traffic, and route selected, policy-based, data streams to and from applications 120.

Figure 3:
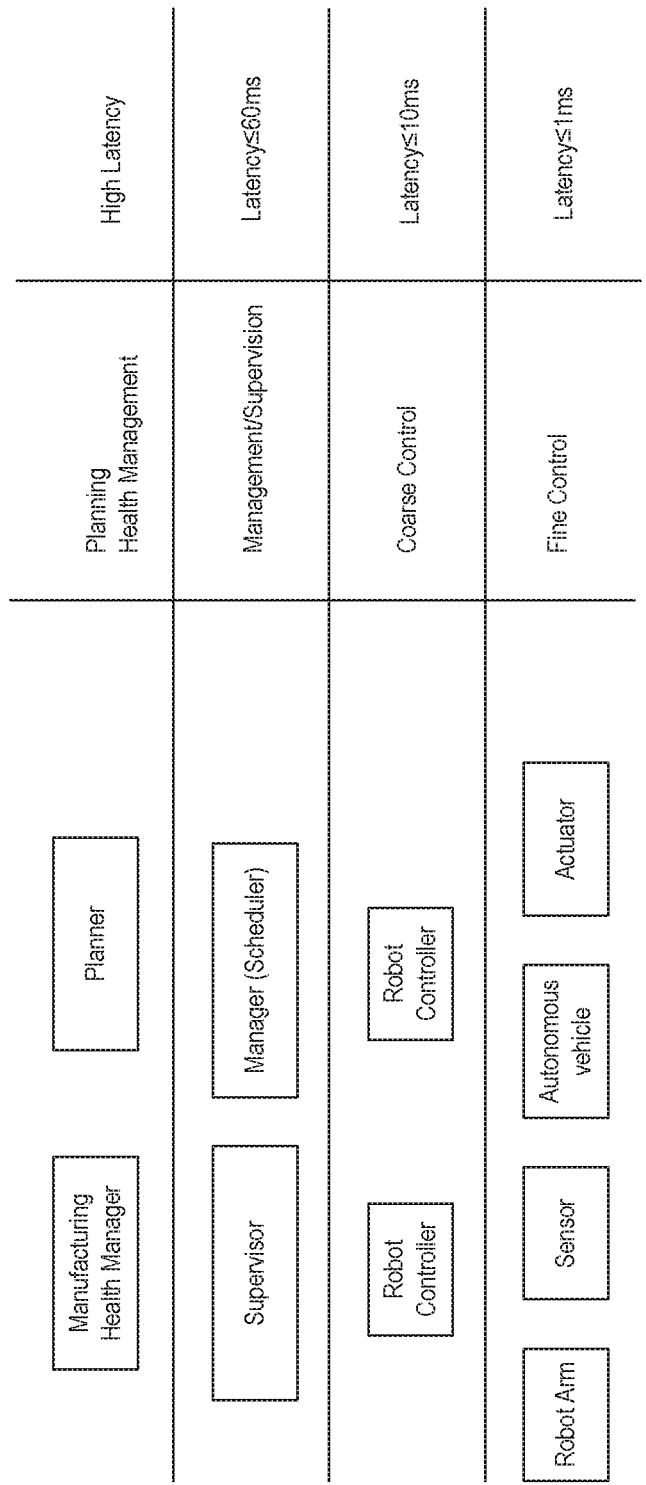
FIG. 3 is a block diagram illustrating a manufacturing framework.

FIG. 3 illustrates an example manufacturing framework, along with a respective latency tolerance for each layer of the framework. In this respect, the term latency refers to the delay between the time that a message is transmitted and the time that the message is received. This message can be a command, a request, an acknowledgement or a response. As may be seen in FIG. 3, planning and management functions can operate with a relatively high latency, whereas control functions require significantly lower latency.

It should be noted that conventional industry automation standards do not explicitly distinguish between coarse and fine control levels. This reflects the conventional system architecture, in which the Industrial Device controller is co-located with the Industrial Device itself, and directly controls all of the Industrial Device's various arms, tools, sensors, and actuators. In this architecture, the relevant latency tolerance relates to the Industrial Device controller, because the latency of the various components of the Industrial Device is not visible to the rest of the system.

On the other hand, the present disclosure contemplates that the ultra-reliable low latency communications (URLLC) capability of 5G NR can be used in embodiments of the present invention. In such cases, the distinction between coarse and fine levels of control, and their associated latency tolerances, is useful.

This document defines the coarse control and fine control as:
  Fine control controls a specific device (e.g. an actuator such as a servo in an Industrial Device arm or an electric motor in an autonomous vehicle). Therefore, fine control operates on a specific process variable, which is typically time critical. Fine control is generally very fast, implying a requirement for a communication channel (e.g. between the controller and the specific device) with ultra-low latency (e.g. less than or equal to 1 ms).
  Coarse control may control more than one process variable or some environment metrics that are important to the manufacturing process, but which are less time critical. Coarse control normally requires communication channels with relatively low latency (e.g. less than or equal to 10 ms), but in some cases may also require communication channels with ultra-low latency depending on what variables or environmental metrics are considered in the control plan.

Typically, an Industrial facility is composed of industrial devices (such as Industrial robots and other equipment) from different vendors. The processes of planning, management and control are treated as separate tasks. Each vendor normally offers its own proprietary management solution, which may or may not interact with management solutions of other vendors. A technician normally decides the role of each industrial device for a given process, and then must develop and install appropriate scripts for each device. In some case, this requires the technician to travel to each device to program it. Since an industrial operator typically has multiple tools, it is difficult to manage the end-to-end operation.

Some Industrial Devices in manufacturing industries rely on an Open Source standard called Robot Operating System (ROS). ROS was first developed at Stanford University, and is an Open-Source framework with an established developer community that has become popular in industry. However, ROS does not support real-time capabilities required by most of the industrial devices. Therefore, a ROS variant called ROS-Industrial, which provides real-time support and other required capabilities for Industrial Device is becoming increasingly popular. ROS-Industrial is an open source solution that contains libraries, tools and drivers for industrial hardware. It is supported and guided by the ROS-Industrial Consortium.

Systems and methods are disclosed herein that provide an integrated system for controlling and managing industrial devices. In accordance with embodiments of the present invention, a system comprises: at least one access node configured to wirelessly transmit and receive signals to and from industrial devices within at least two cells of a cellular communications network deployed within an industrial facility; and a computer system that comprises: an interface connected to transmit and receive signals to and from the access node; and processing circuitry configured to: define a manufacturing process instance, MPI, identifying industrial operations necessary to perform a predetermined industrial process; allocate one of more of the industrial devices to the MPI, each allocated industrial device configured to perform at least one of the identified industrial operations; and implement one or more Controllers configured to control each of the industrial devices allocated to the MPI to cooperatively perform the predetermined industrial process.

For the purposes of the present disclosure, an industrial facility is any area (which may be composed of one or more buildings and/or yards) used for an industrial purpose such as manufacturing, storage or transport. Examples of industrial facilities include (but are not limited to) factories, warehouses, fulfillment centers, storage yards, rail yards, port facilities and the like.

For the purposes of the present disclosure, a manufacturing process refers to a sequence of one or more operations that yields a defined result. For example, in a factory, a manufacturing process may comprise the operations that need to be performed to convert a feed-stock (e.g. raw material) into a finished part. In an assembly plant, a manufacturing process may comprise operations for assembling multiple parts in a defined order to produce a finished product, such as an automobile. An industrial process is a broader concept that includes manufacturing processes, but also encompasses other tasks such as storage, forwarding and transport. For example, in a rail-yard context, an industrial process may refer to the sequence of operations required to remove a shipping container from a rail car, temporarily store the shipping container in a storage yard, and subsequently place the shipping container on a transport trailer.

For the purposes of the present disclosure, an industrial operation is a discrete operation within an industrial process. In many cases, an industrial operation will be performed by a particular machine or device, and at a particular time. Thus, in some embodiments, different industrial operations within an industrial process are performed by corresponding different machines and/or at different times.

For the purposes of the present disclosure, an industrial device refers to any machine or equipment that is configured to perform one or more industrial operations, and is also capable of communicating with computer systems in accordance with the present disclosure. Examples of industrial devices include (but are not limited to) industrial robots, autonomous vehicles, autonomous guided vehicles (AGVs), sensors, actuators, and controllers (which may be associated with other machines such as milling machines or stamping machines, for example).

Figure 4:
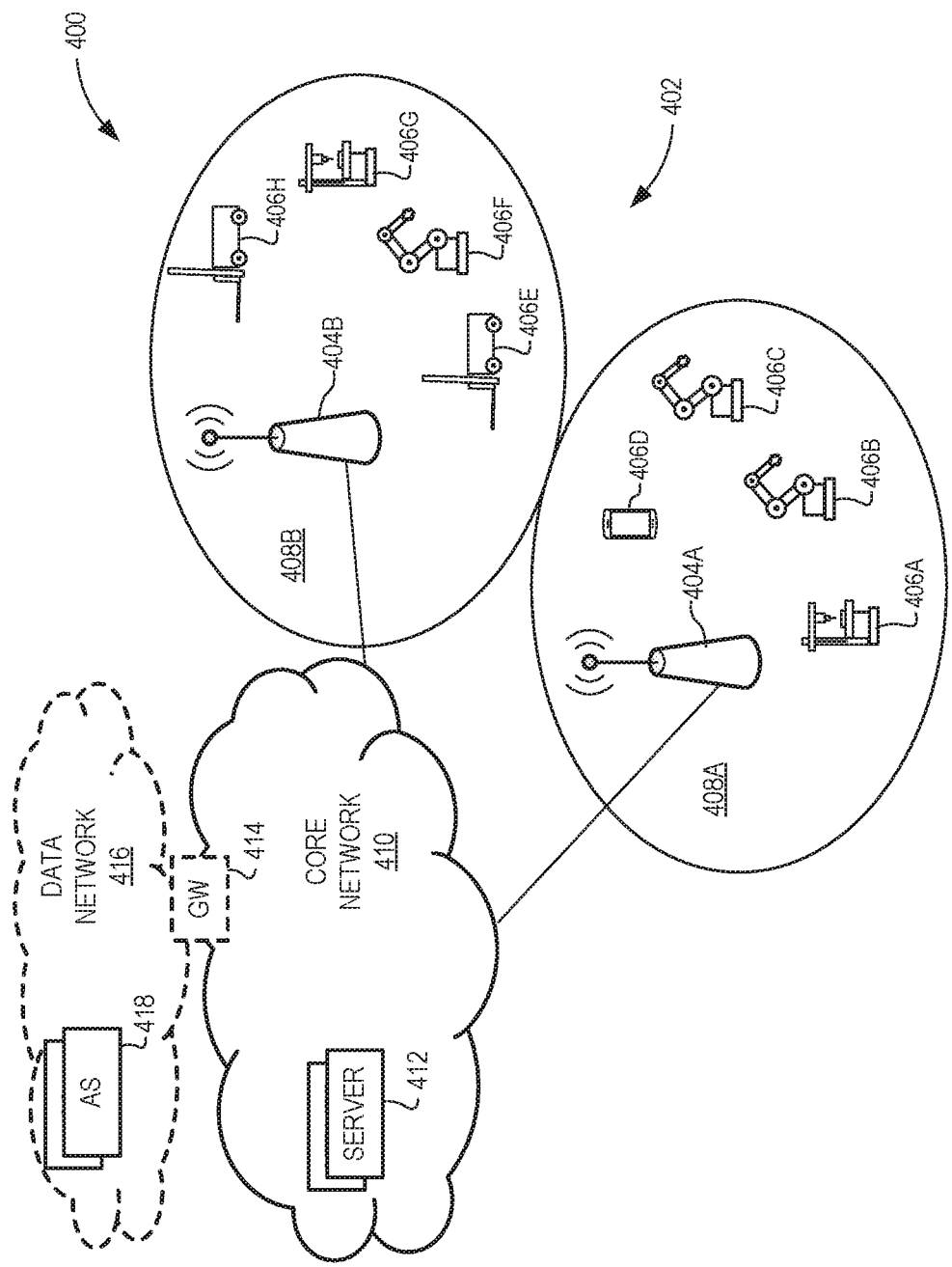
FIG. 4 is a block diagram illustrating an example cellular communications network in accordance with embodiments of the present invention.

FIG. 4 illustrates one example of a cellular communications network 400 in accordance with embodiments of the present disclosure. In the embodiments described herein, the cellular communications network 400 may conform to one or more of the LTE, 4G and 5G NR standards, or their successors. In the illustrated example, the cellular communications network 400 includes a Radio Access Network (RAN) 402 comprising access nodes 404A and 404B controlling radio communications with industrial devices 406A . . . 406H within corresponding cells 408A and 408B. Each cell 408 may be defined by any suitable combination of geography, frequency, Radio Access Technology (RAT), modulation scheme and access node identifiers. In some embodiments, a cell 408 may be referred to as a manufacturing cell (MC).

Access nodes 404A and 404B can be any type of network access device capable of establishing radio connection(s) with one or more industrial devices 406 within a respective coverage area of the access node 404, and further configured to forward signaling traffic between the industrial devices 406 and a core network 410.

An important feature of an access node 404 is that it is configured with both a radio interface configured to send and receive radio signals to and from industrial devices 406, and a network interface configured to exchange electronic and/or optical signals with the core network 410. Examples of access nodes 404 include: Evolved Node B (eNB) and gNB systems (known, for example, in the 3GPP standards): WiFi access points (known, for example from IEEE 802.11 standards) or the like. In some contexts, an access node 404 may be referred to as an access point (AP) regardless of the Radio Access Technology (RAT) that it supports.

Industrial devices 406 can be any type of industrial equipment or machinery configured with radio and/or wired communications circuitry capable of sending and receiving signals to and from an access node 404. Examples of industrial devices 406 include industrial robots, sensors, actuators, machine controllers, mobile computers, Internet of Things (IoT) devices, autonomous vehicle controllers, AGV controllers and the like. In some contexts, an industrial device 406 may be referred to as a User Equipment (UE) or a mobile device.

In some embodiments, the cells 408A and 408B may overlap each other. For example, a particular cell 408A may be one among a plurality of cells covering a common geographical region and having a common RAT and modulation scheme, but using respective different frequencies and/or access point (AP) identifiers. In such cases, an industrial device 406 located within a region covered by two or more overlapping cells 408 may send and receive radio signals to and from each of the corresponding access nodes 404.

In the illustrated example, the RAN 402 is connected to a Core Network (CN) 410, which may also be referred to as Evolved Core Network (ECN) or Evolved Packet Core (EPC). The CN 410 includes (or, equivalently, is connected to) one or more servers 412 configured to provide networking services (such as, for example, Network Functions (NFs) described in 3GPP TS 23.501 V15.2.0 (2018 June) "System Architecture for the 5G System" and its successors) as control and supervision services for industrial devices 406. The CN 410 may also include one or more gateway (GVV) nodes 414 configured to connect the CN 410 to a packet data network (DN) 416 such as, for example, the internet. A gateway node 414 may be referred to as a packet gateway (PGVV) and/or a serving gateway (SGVV). The DN 416 may provide communications services to support end-to-end communications between servers 412 and one or more application servers (ASs) 418. In some contexts, an application server (AS) 418 may also be referred to as a host server.

It should be appreciated that the separation between the CN 410 and the DN 416 can be purely logical, in order to simplify understanding of their respective roles. In particular, the CN 410 is primarily focused on providing industrial device access, control and supervision functions and supporting wireless device mobility within a particular industrial facility. On the other hand, the DN 416 is primarily focused on providing end-to-end communications and management functions across multiple industrial facilities. However, it will be appreciated that both the CN 410 and the DN 416 can be implemented on common physical infrastructure, if desired.

In conventional techniques, an industrial process happens in an industrial facility that provides a set of rigidly defined resources, such as Industrial Devices 406, performing pre-defined tasks to achieve a determined goal. For example, in an automobile assembly line, several Industrial Devices 406 can collaborate to assemble an automobile. The assembly line is optimized to build a specific model of automobile with high efficiency. Unfortunately, the trade-off is that this process is rigid in that it cannot easily be changed to produce a different type or model automobile. To do the change, several modifications have to be performed such as modifying the Industrial Device 406 programming and tools, re-adapting some machinery to new specifications of the new automobile, creating or deleting new tasks, and so on.

In contrast, Industry 4.0 calls for an agile industry that the manufacturing process is modularized and therefore it can be easily adaptable to the changes by demand, easily configurable and customizable and just in time production.

In the present description, the term Software Defined Manufacturing (SDM) generally describes a reference architecture and methods for achieving the goals of Industry 4.0. Example properties and benefits of Software Defined Manufacturing (SDM) may include:

Agile Planning: An industrial facility may have more than one industrial process, and may add new processes or modify existing processes easily.

Control with Minimal Human Intervention: The control and supervision of industrial processes should be automated. Human intervention is focused on planning and supervision reviewing.

The control is focused on efficiency and quality assurance (QA). Closed-Loop Gain Control (CLGC), sometimes referred to as Closed Loop Control (CLC), is extensively used as a process to assure the efficiency and QA are matched.

Supervision includes self-healing capabilities which require maintenance to be done by Industrial Devices 406. The focus also is based on preventive maintenance.

The machinery is generic and dynamically allocated to manufacturing processes: The use of statically allocated machinery to a process is reduced. For example, Industrial Device 406 arms can be re-allocated to a different manufacturing process if the demand requires.

On-line Manufacturing: Manufacturing of a part is started preferably when an order takes place.

The manufacturing process is defined by software, which means, a process definition is created in a computer which contains specifications of resources used by the process, what is the desired output, quality assurance (QA) parameters, control definitions and so on. This manufacturing process can be further instantiated with resources (e.g. Industrial Devices 406) of the facility and tasks in the plans to produce the desired output via the smart manufacturing framework.

In some embodiments, the principles of virtualization described above with reference to FIG. 2 may be used to implement SDM. For example, process and device control and supervision functions may be implemented as applications 120 executing within virtual machines 210 or within containers 211, using virtualized hardware resources 202, which in the case of industrial processes may include industrial devices 406 and other resources of an industrial facility in addition to computing, data storage and communications resources.

To achieve a successful SDM implementation, an automated Closed-Loop Gain Control with high accuracy is important.

CLGC is useful in Industrial Device 406 automation especially in smart manufacturing as it is a key mechanism to control Industrial Device 406 operations in manufacturing processes especially in real-time. In some contexts, the term controller in fact refers to a CLGC controller as it is the most common and used type of control in manufacturing. An example of such type of CLGC controller can be Proportional Integral Derivative (PID) controllers commonly integrated with Programmable Logic Devices (PLCs) used in industrial facilities to control manufacturing processes.

CLGC is based on instantaneous or very low latency feedback signals from a process output with highly predictable timing accuracy. This allows delicate control of Industrial Device 406 operations to be performed such as motion operations of Industrial Device 406 arms. Isochronous real-time communications enable integration support for real-time closed-loop control with very low latency. These applications are critical for the efficiency and quality assurance of an automated manufacturing process involving Industrial Devices 406, autonomous vehicles, and sensors.

CLGC contains a functional block called a controller. The controller operates to control a manufacturing (or other industrial) process through a variable gain process (VGP) by periodically reading a feedback signal derived from the output of the process and applying corrections when needed. The time between sensing the output to produce the feedback signal and applying the correction to the VGP adjusting the manufacturing process should be as small as possible. A large delay could invalidate the correction calculated from the feedback signal, resulting in, for example, damages to the production line and causing safety issues. The correction intervals also should be the same, avoiding large jitters, to keep the precision and stability of the CLGC algorithm executed in the controller.

Thus, CLGC control in manufacturing processing is an isochronous task requiring real-time execution and tight time-slotted communication between the CLGC controller and meters that measure the signal for the feedback. Typically, a CLGC cycle time could consist of either:

A periodic downlink transaction from the CLGC controller to a set of meters which is followed by uplink responses with measurement values to the CLGC controller; or A periodic downlink transaction from the CLGC controller to a set of VGPs which is followed by uplink responses by the VGP to the CLGC controller.

In the description of these algorithms presented herein, the following definitions are adopted:

mv(t) is the manipulated variable at time t, $K_c(t)$ is the controller gain at time t, PV(t) is the process variable at time t, CV(t) is the controlled variable at time t, SP(t) is the set-point at time t, $\tau_I$ is the integral time constant, $\tau_d$ is the derivative time constant, e(t) is the error at time t, and b is defined as the output of the controller when the error is zero, that is, it is the compensation due to environmental sensors.

The most common CLGC algorithms used in this disclosure are the On/Off Controller; the Proportional Controller; and the Integral Controller. See, for example: 1) W. Svrcek, D. Mahoney and B. Young, "A Real-Time Approach to Process Control," John Wiley & Sons, p. 93-113, ISBN: 9781119993872, 2014., Chapters 3 and 4; and 2) S. Mitsi, K. D. Bouzakis, G. Mansour and D. Sagris, "Off-line programming of an industrial Device 406 for manufacturing," International Journal of Advanced Manufacturing Technology, no. 26, p. 262-267, 2005. Each of these controllers is described below.

In the On/Off controller, mv(t) is defined by:

$$mv(t)=0 \text{ if } PV(t)>SP(t) \text{ and } mv(t)=100\% \text{ if } PV(t) \leq SP(t)$$

The realization of this controller can use an asynchronous communication based on the notifications sent from the meter to the controller. The notification ON is sent when PV(t)>SP(t) and the notification OFF is sent when PV(t)≤SP(t).

In a Proportional controller, mv(t) is defined by:

$$mv(t)=K_c e(t)+b$$

In the Integral Controller, mv(t) is defined by:

$$mv(t) = \frac{1}{\tau_I} \int_0^\tau e(t)dt + mv(t_0)$$

where $mv(t_0)$ is defined as either the controller output before integration, the initial condition at time zero, or the condition when the controller is switched into automatic.

In addition, various combination of these controllers may include:

A Proportional Plus Integral (PI) Controller, in which mv(t) is defined by:

$$mv(t) = K_c \left[ e(t) + \frac{1}{\tau_I} \int_0^\tau e(t)dt \right] + b$$

A Proportional Plus Derivative Controller, in which mv(t) is defined by:

$$mv(t) = K_c \left[ e(t) + \tau_d \frac{de}{dt} \right] + b$$

A Proportional Integral Derivative (PID), in which mv(t) is defined by:

$$mv(t) = K_c \left[ e(t) + \frac{1}{\tau_I} \int_0^\tau e(t)dt - \tau_d \frac{CV}{dt} \right] + b$$

Figure 5:
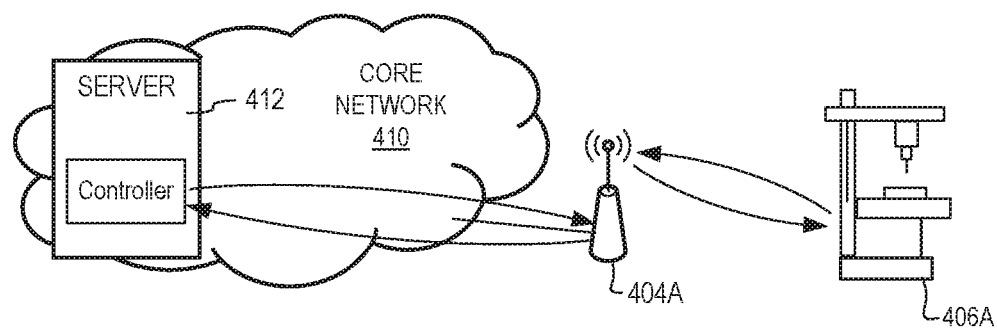
FIG. 5 is a block diagram illustrating an example controller implemented in a server of the cellular communications network of FIG. 4.

FIG. 5 shows an example embodiment in which a CLGC Controller 500 is implemented in a server 412 of a 4G/5G core network 410. The CLGC controller 500 may trigger a periodic message to the industrial device 406 to obtain measurement values from a set of meters or assign gain values for VGPs on the industrial device 406. The CLGC controller 500 may be expected to receive a response message with feedback data. Since the message exchange is isochronous, the data stream is also isochronous with high predictability.

In alternative embodiments, the controller 500 may be co-located with the Access Node 404 rather than a server 412.

Figure 6:
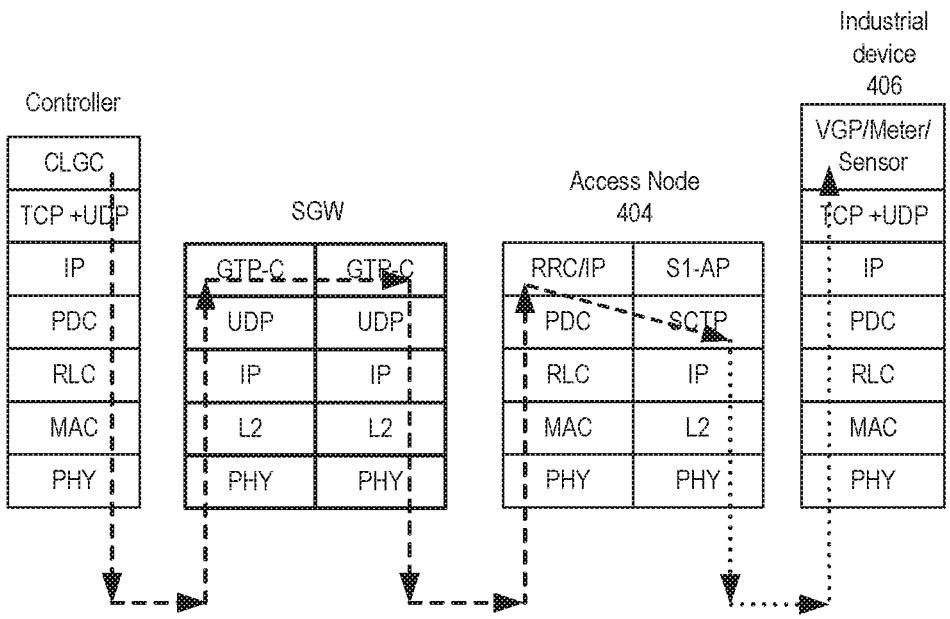
FIG. 6 is a block diagram illustrating an example packet flow in the implementation of FIG. 5.

FIG. 6 illustrates an example packet flow of the CLGC controller implemented using the TCP/IP stack on a 4G/5G network. The dashed lines indicate the flow through the several nodes in the network. The flow originates in the CLGC Controller UE and goes all the way up to the Industrial Device 406. To get to Industrial Device 406, the TCP/IP packet from the controller UE is sent down through its TCP/IP and 4G/5G stacks. In the 4G/5G PHY the TCP/IP packet is sent via Ethernet to the service gateway (SGW, not shown in FIG. 5). The SGW forwards the IP packet (via Ethernet) to the Access node 404. Within the SGW the TCP/IP packet goes all the way down through the TCP/IP and 4G/5G stacks and it is sent to the Industrial Device 406 through the air interface. The Industrial Device 406 receives the packet from its air interface and sends it to the VGP, meter or sensor destination.

The following description is divided into four subsections: A description of Reference Model, A flowchart, A detail explanation of Manufacturing Process Instance and Use case examples.

Figure 7:
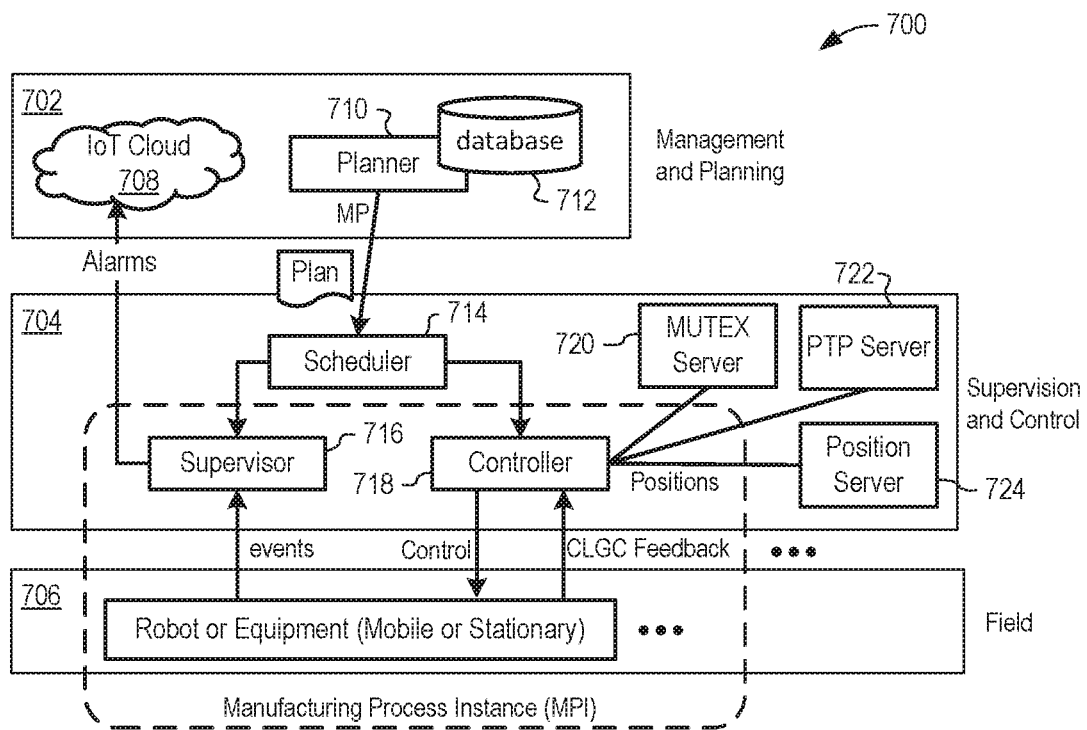
FIG. 7 is a block diagram illustrating an example Software Defined Manufacturing Reference Architecture in accordance with embodiments of the present invention.

As described above, the term Software Defined Manufacturing (SDM) has been introduced herein to refer to a reference architecture and methods for realizing the objectives of Industry 4.0. FIG. 7 illustrates an example Software Defined Manufacturing Reference Architecture 700 in accordance with embodiments of the present invention. Use cases are disclosed below to show how this proposed model can address real industry problems. For ease of understanding, the following description is focused on examples based on a manufacturing context. As such the terminology used relates specifically to manufacturing. However, it will be appreciated that the same techniques can be equally applied to industrial facilities and processes other than manufacturing.

As shown in FIG. 7, the reference architecture 700 includes a management and planning layer 702, a supervision and control layer 704 and a field layer 706 composed of physical resources of the industrial facility such as industrial devices 406, loading docks, storage areas and working areas. The planning, supervision and control layers 702 and 704 may be implemented as one or more computer systems as described above with reference to FIGS. 1A and 1B, and may form part or all of the core network 410 described above. In the illustrated example, the planning layer 702 includes an Internet of Things (IoT) cloud 708, a planner 710 and a database 712, while the supervision and control layer 704 includes a scheduler 714, a supervisor 716, a controller 718, a mutual exclusion (MUTEX) server 720, a PTP server 722 and a Position server 724.

In some embodiments, the field layer 706 may comprise physical resources and a virtualization layer that operates to present virtualized resources to upper layers, in a manner directly analogous to that described above with reference to FIG. 2. For example, the functions and services of the management and planning layer 702 and supervision and control layer 704 may be implemented as applications 120 executing in virtual machines 210 or containers 211 hosted by an application platform 206, and using virtualized resources of the industrial facility presented to the application platform 206 by the virtualization layer 204.

This reference architecture 700 is an abstract layered structure, that defines three abstraction layers:
Management and Planning: This layer is the planning and management applications of the SDM.
Supervision and Control: This layer is responsible for the supervision and control in each of the Manufacturing Process Instance (MPI).
Field: This is the Industrial Device 406 communication of MPI and the Industrial Device 406 control layer itself.

The example reference model of FIG. 7 has white boxes which indicate functions having counterparts in conventional systems (e.g. in ROS industrial and/or IEC standards). However, the present description invention describes enhancements to their conventional functionality, and complements legacy functional blocks with new functional blocks and new interactions to fulfill requirements of Industry 4.0, ROS Industrial and IEC simultaneously.

Figure 8:
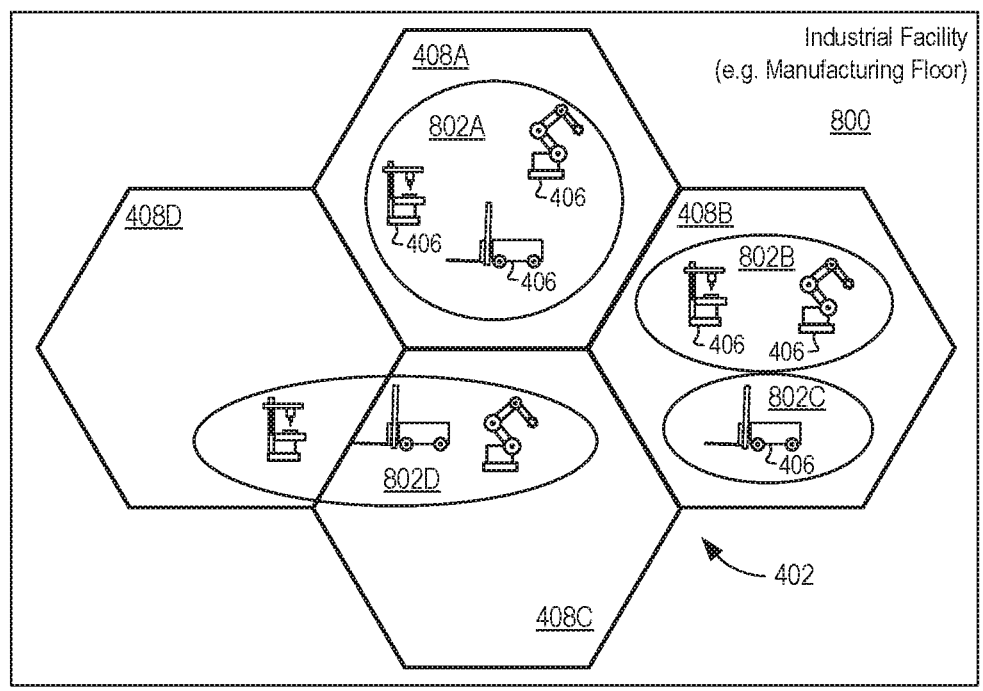
FIG. 8 is a block diagram illustrating an access network of FIG. 4 deployed in an industrial facility.

FIG. 8 illustrates an industrial facility 800 such as a manufacturing floor in which a radio access network 402 comprising a set of four adjacent cells 408 is deployed. As noted above, each cell 408 may be defined by any suitable combination of geography, frequency, Radio Access Technology (RAT), modulation scheme and access node identifiers. If desired, conventional hand-over techniques (based on signal strength or radio signal coverage, for example) may be used for handling mobile devices (such as autonomous vehicles and AGVs) that move from one cell 408 to another. Alternatively, fixed "geographical" boundaries between adjacent cells 408 may be defined within the industrial facility 800, and hand-over of a mobile device from one cell to another triggered by the location (and/or speed and direction) of the mobile device within the industrial facility 800.

FIG. 8 also illustrates a set of Manufacturing Process Instances (MPIs) 802 within the industrial facility 800. As will be described in greater detail below, an MPI is a logical construct which identifies industrial operations necessary to perform a predetermined industrial process, and one or more industrial devices or Manufacturing Processes (MPs) that are configured to perform those industrial operations. In some embodiments, all of the industrial devices allocated to a given MPI 802 are located within a common cell 408. For example, FIG. 8 illustrates an embodiment in which MPI 408A encompasses all of the industrial devices 406 within cell 408A, and another embodiment in which the industrial devices 406 within cell 408B are allocated to two different MPIs 802B and 802C. These arrangements are beneficial in that in each case, all of the industrial devices 406 of a given MPI 802A . . . 802C are connected to a single access node 404, which helps satisfy the latency requirements of fine control functions (See FIG. 3).

FIG. 8 also illustrates an alternative embodiment, in which MPI 802D encompasses industrial devices 406 located in two difference cells 408C and 408D. In such embodiments, the required inter-cell packet flows may make it more difficult to meet low latency demands of fine control functions. However, where higher latency can be either tolerated, or inter-cell packet flows managed to minimize impacts on latency, an MPI 802 may span two or more cells 408.

Referring back to FIG. 7: The Planner 710 is responsible for taking manufacturing orders and breaking it down into fine steps. Each step in a manufacturing process (MP), and the MP as a whole, is a logical set that is specified by a collection of resources and one or more plans, such as, for example, a motion plan, a mobility plan, a task plan, a control plan, a supervision plan and a calibration plan. An MP is defined by a Planner and takes places in one or more MPIs, that means, the MP is instantiated in one or more MPIs to process an order.

The IoT Cloud 708 is responsible for collecting alarms and equipment status so that the consolidated information can be displayed on-demand.

The database 712 may be subdivided as follows:
A Processing Cell (or Manufacturing Cell) Database may contain processing cell definitions. Cell definitions specify the allocated resources to the cell such as Industrial Devices 406 and computing resources.
A Manufacturing Processes Database may store MP(s) created to process a manufacturing order and its plans such as control plans, supervision plans, motion plans and mobility plans.
A Calibration Database may contain calibration tables for industrial devices and manufacturing processes.

The scheduler 714 is responsible for triggering the execution of manufacturing process definitions through one or more processing plans received from the planner 710 by:
Creating, starting and stopping manufacturing process instances.
Allocate resources to manufacturing process instances.
Handover of mobile devices between MPIs.

The PTP server 722 is responsible to provide a constant time reference across all nodes in the SDM reference model. It ensures all entities are time synchronized so that the tasks described in the collection of plans can be executed correctly. The PTP server can be substituted by any high accuracy time synchronization server.

The Position server 724 is responsible to monitor and track the location of industrial devices 406 (and especially mobile devices) within the industrial facility.

The manufacturing processing instance (MPI) may include a controller 718, supervisor 716 and multiple industrial devices 406, at least some of which may be mobile devices.

The supervisor 716 is the entity that handles or reacts to synchronous and asynchronous events originating inside the framework, for example as alarms from controllers of manufacturing processes or alarms resulting from monitoring determined properties of the manufacturing processes.

The Controller 718 controls the execution of the plans to each of the Industrial Devices 406 under its control.

Figure 9:
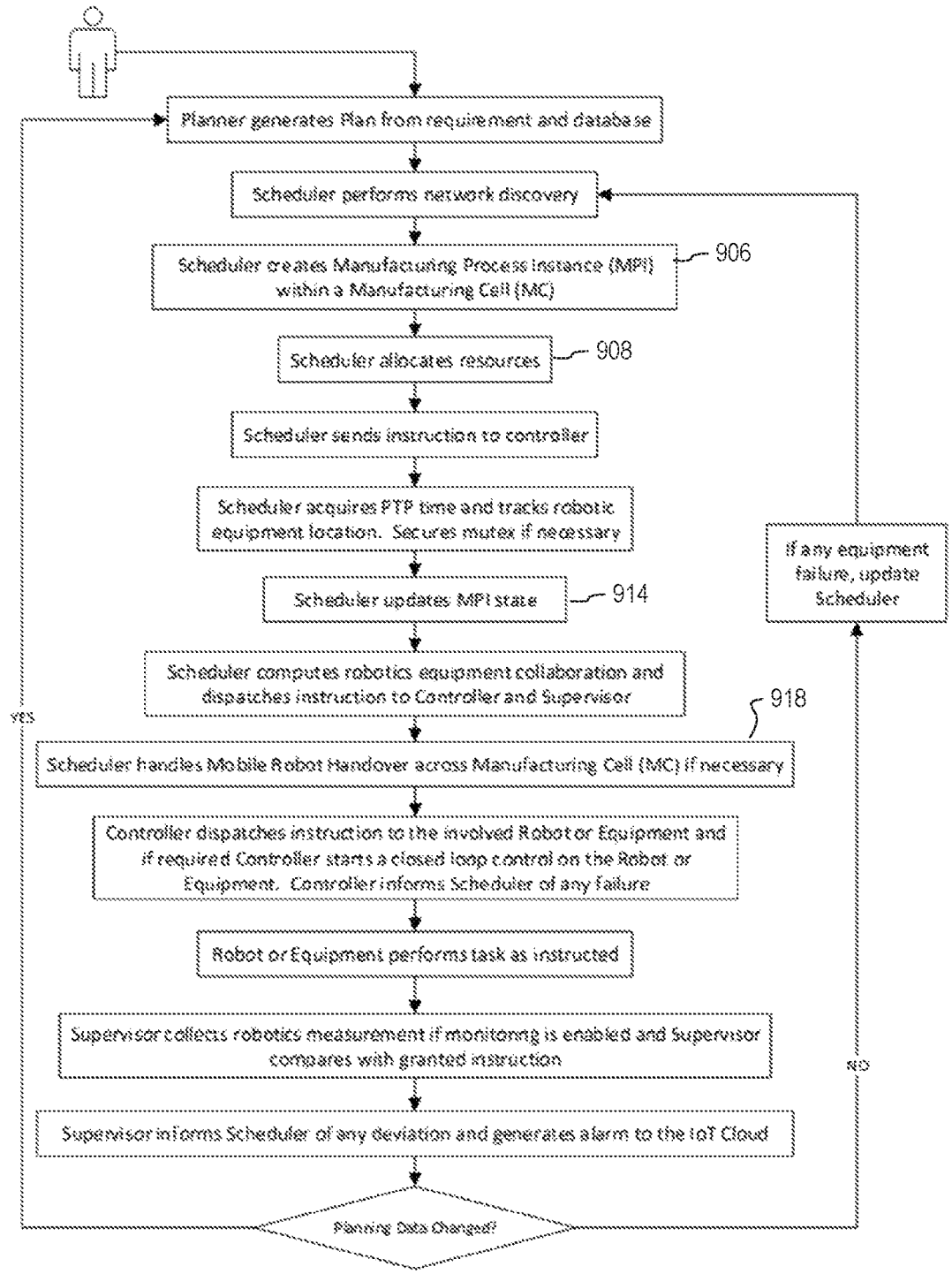
FIG. 9 is a flowchart describing an example process in accordance with embodiments of the present invention.

FIG. 9 is a flowchart describing an example process in accordance with embodiments of the present invention. Some steps in the flowchart will be explained further in the following subsections

Step 906: Scheduler creates a Manufacturing Process Instance (MPI)

Figure 10:
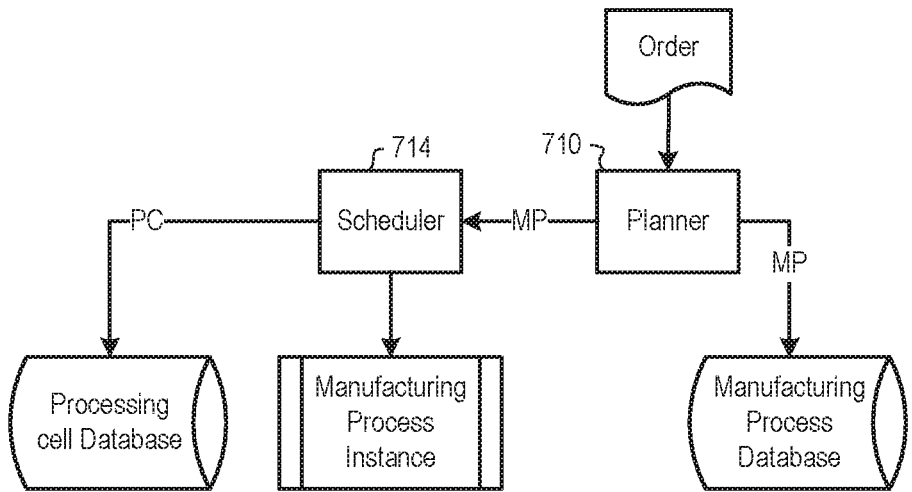
FIG. 10 is a block diagram illustrating creation of a manufacturing process instance in the example process of FIG. 9.
Figure 11:
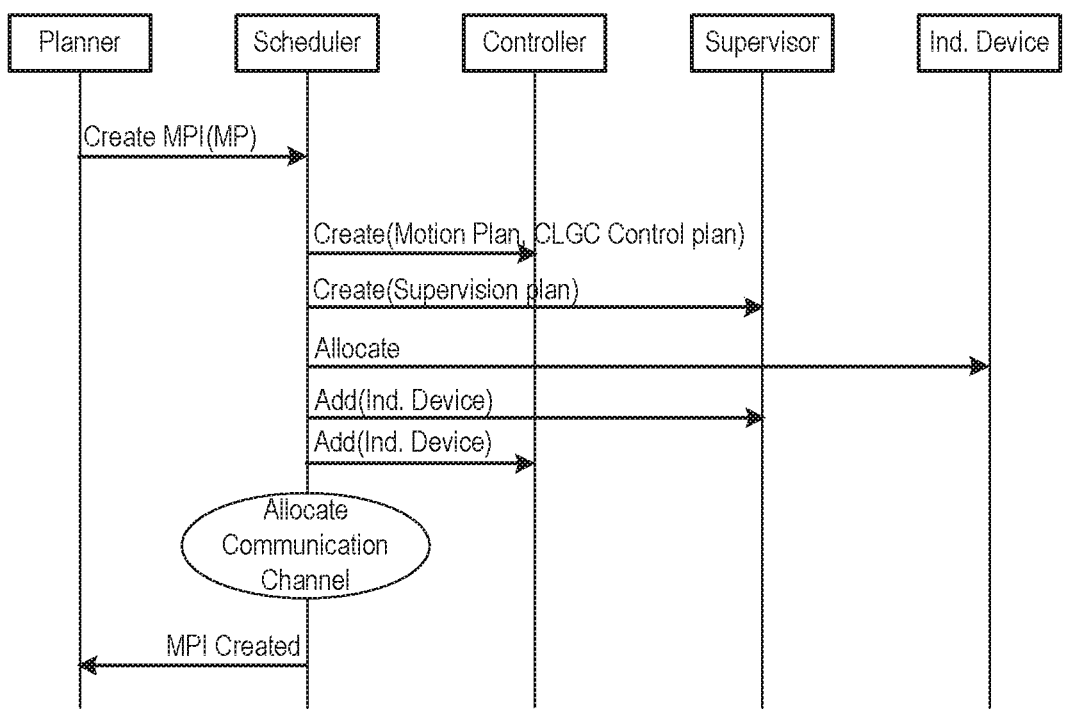
FIG. 11 is a message flow diagram illustrating an example process to create an MPI.

Reception of an order may trigger the Planner 710 to create an MP which can originate one or more MPI(s). This is illustrated in FIG. 10. An MPI is created by the scheduler 714 in response to a request from the planner 710 which sends a Manufacturing Process specification to the scheduler to create one or more corresponding MP's. FIG. 11 illustrates an example sequence of messages to create an MPI. Before creating the MPI, the scheduler 714 may verify that there are sufficient physical resources in the SDM resource pool to meet the requirements specified in the MP. If enough resources are available, the MPI is created and resources are allocated to it.

Step 908: Scheduler allocates resources. Allocation of resources involves allocating Industrial Devices and allocating communication channels.

Figure 12:
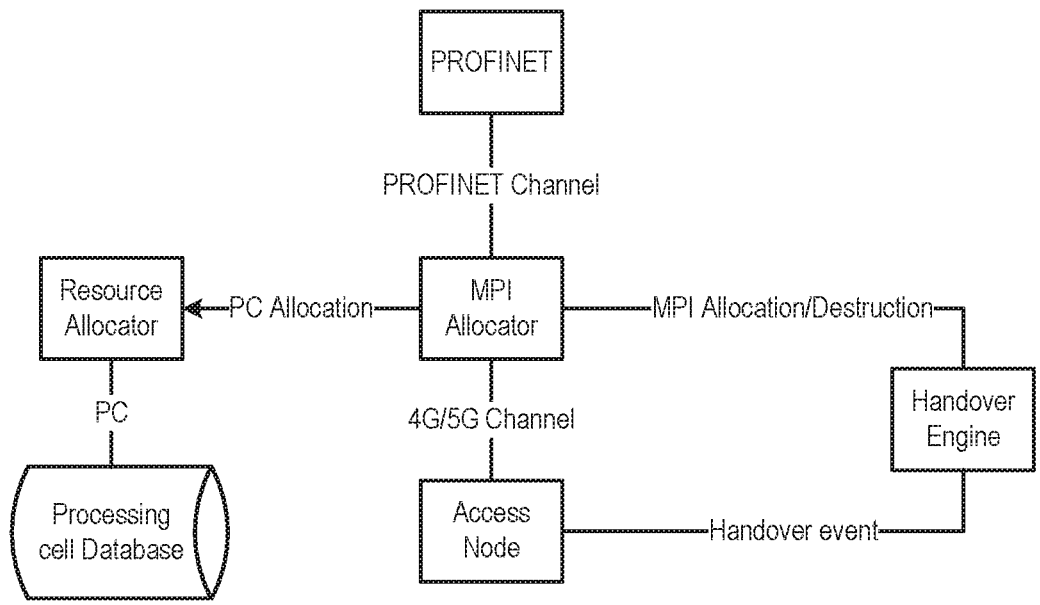
FIG. 12 is a block diagram illustrating example operations of the scheduler during handover.
Figure 13:
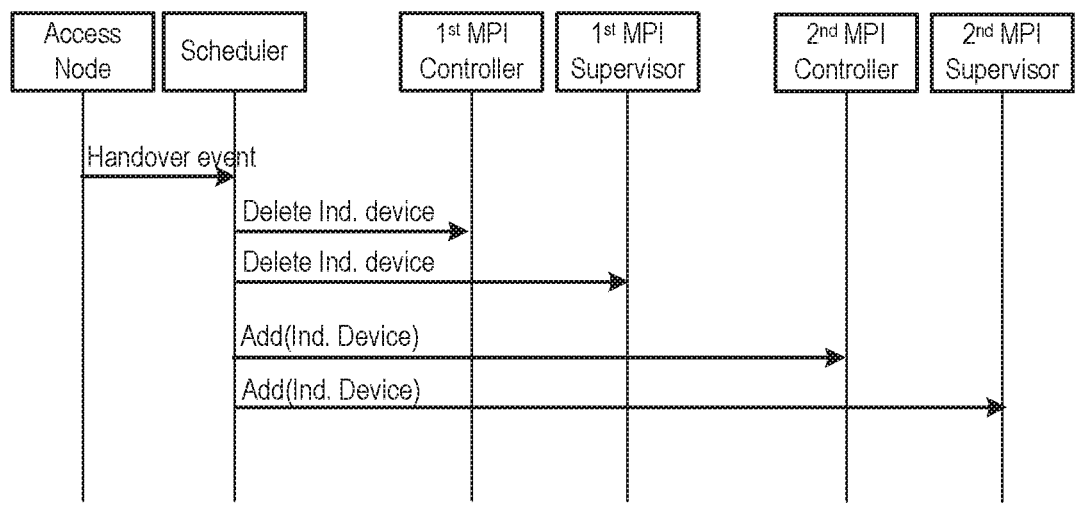
FIG. 13 is a message flow diagram illustrating an example process to hand-over an industrial device from a first MPI to a second MPI.

Step 918: Scheduler 714 handles Mobile Industrial Device 406 Handover to a new MPI. Mobile Industrial Device 406 handover is done when the Industrial Device 406 moves between different MPIs. As shown in FIG. 12, the Handover Engine, operating as part of the Scheduler, receives a Handover Event. The MPI allocation and destruction of the entity representation of the Industrial Device 406 that is to be handed over happens over the 4G/5G channel and the relevant Processing Cell Database is updated to reflect the changes. FIG. 13 illustrates an example message sequence of an industrial device handover process. An event is generated and sent to the Scheduler which handles the event. The Scheduler deletes the device from the Controller and Supervisor of the corresponding $1^{st}$ MPI to which the device is allocated. Then the Scheduler adds the device to the Controller and the Supervisor of the $2^{nd}$ (target) MPI that is to receive the device.

As FIG. 13 illustrates, the handover takes place by deleting the Industrial Device 406 from the first MPI and adding it to the second MPI. Deleting and adding Industrial Device 406 to a new MPI as illustrated by FIG. 13 implies no-disruption of the industrial process implemented by the $1^{st}$ MPI. Otherwise the handover might not be successful, or one or more additional actions may be taken such as a shutdown of the 1st MPI by the Supervisor.

Figure 14:
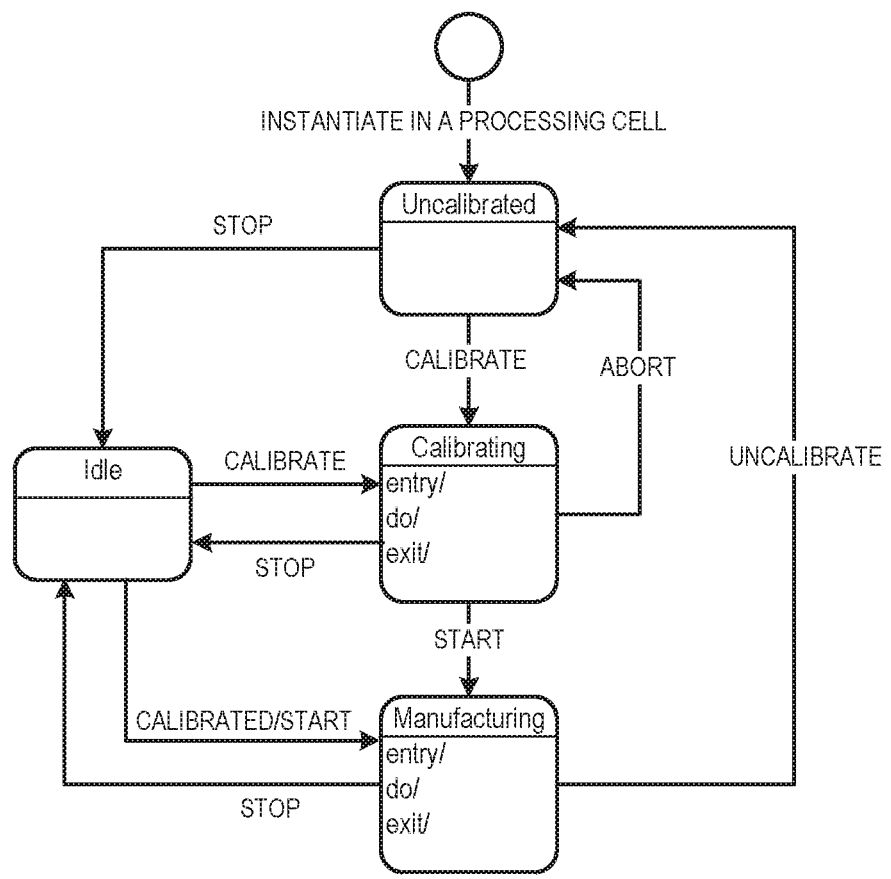
FIG. 14 is a block diagram illustrating example states of an MPI.

Step 914: Scheduler updates MPI states. FIG. 14 shows example states of a manufacturing process instance (MPI). If an MPI is uncalibrated, a manufacturing process may not be executed to process an order. In some embodiments, the MPI must be calibrated before running a manufacturing process.

Figure 15:
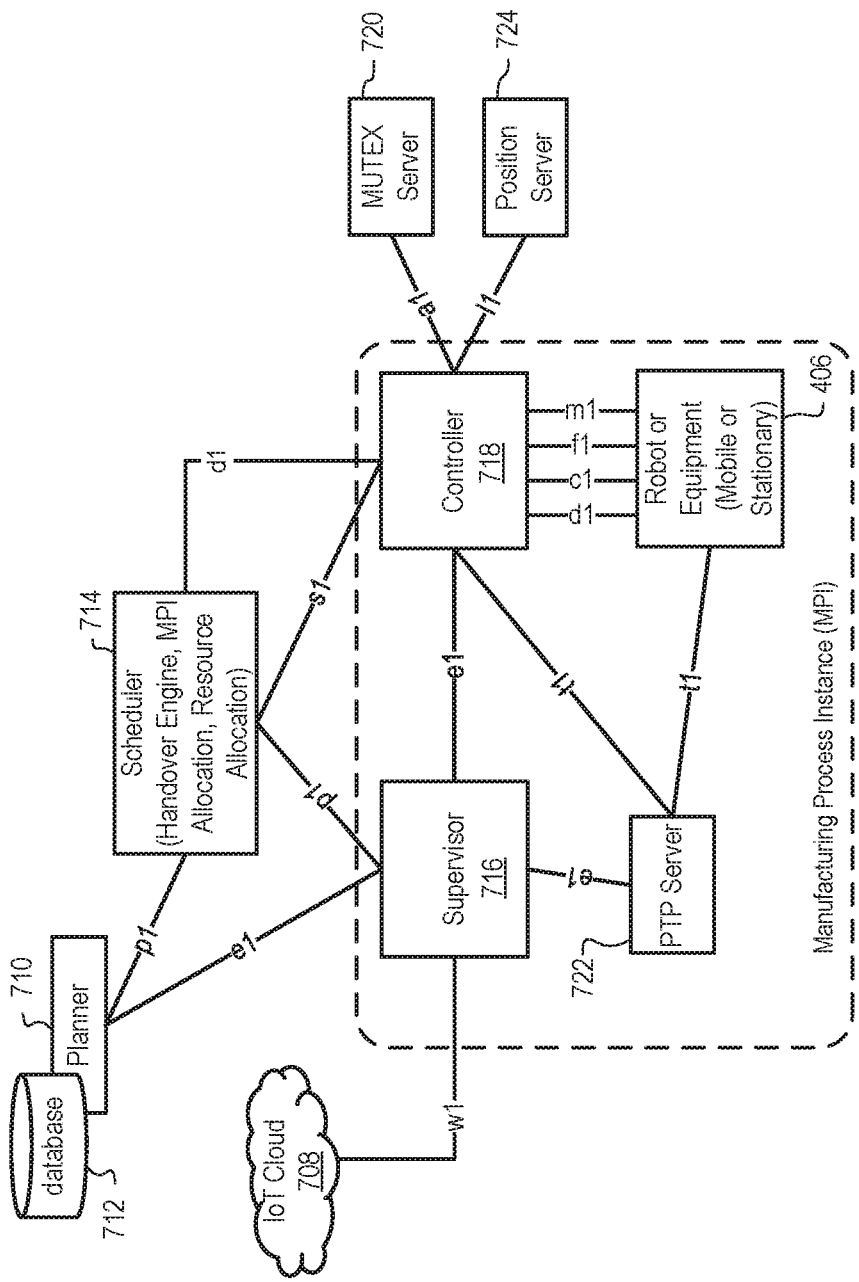
FIG. 15 is a block diagram illustrating example SDM functional blocks and interfaces.

To achieve the flow chart illustrated in FIG. 9, it is important to illustrate the type of information being exchanged. FIG. 15 shows example SDM functional blocks and interfaces between these functional blocks. As shown in FIG. 15, an MPI has the following main blocks:
Supervisor 716: Receives supervision control events from the controller through interface e1. As a consequence, it may request healing actions to the controller 718 via interface e1 and/or publish event logs to the IoT Cloud through interface w1. The healing actions and events are described in the supervision plan. Optionally, the Supervisor can monitor Quality Assurance (QA) metrics for the output of the order as described in the supervision plan.
Controller 718: It executes the coarse and fine control of the industrial devices 406 allocated to the MPI as described in the control plan. It uses the interface c1 for the device's coarse control and interface f1 for the device's fine control. It also takes the motion plan from the planner and executes it through interface m1 to the device.
Industrial Device 406: It gets the motion or mobility commands from the controller 718 through interface m1 and executes the commands while it is controlled from the controller 718 through interfaces c1 and f1. Additionally, when the Industrial Device 406 is started and connected to the controller, it sends to the controller through interface d1 its capabilities which is further forwarded by the controller to the planner.

Shared functional blocks are blocks whose instances are shared or communicates with different MPIs. These are:

- IoT Cloud: It keeps the database of event logs collected from supervisor through interface w1 and generates smart manufacturing health reports.
- Planner with database: Generates control, calibration, mobility, and motion plans which are sent through interface p1 to the scheduler. It also generates the supervision plan and sends to the supervision through interface e1. However, to generate these plans, the planner must know in advance the resource availability from the scheduler (through interface p1) which is sent by the controller through interface d1 every moment a new Industrial Device 406 is discovered (connected to the controller).
- PTP server: It keeps the time synchronization among Controller and Industrial Devices 406 through interface t1.
- Position Server: It keeps mappings and location references and implements location services for mobile Industrial Devices 406 such as autonomous vehicles and AGVs.
- MUTEX Area: It is a system area where all the MUTEXes are kept for collaboration between streamlines tasks.
- Scheduler: It creates new MPI instances by coordinated creation of MPI functional blocks (scheduler, controller and supervisor). It also handover procedures of mobile Industrial Devices 406. FIG. 12 illustrates the functional blocks of the scheduler
- MPI Allocator: It is responsible for MPI creation and destruction.
- Resource Allocator: It is responsible for allocating resources to each MPI
- Handover Engine: It is responsible for the handover management.

An SDM framework may contain two types of communication interfaces as follows:

- Best-effort (or non-real time) interfaces: Interfaces that do not require isochronous real-time transmissions such as negotiation of Industrial Device 406 capabilities (via TCP) and SDM management of MPIs. Best-effort interfaces may comprise any one or more of the l1, d1, s1 and p1 interfaces
- Isochronous Real-time: interfaces for isochronous real-time transmissions such as motion control, path control and CLGC control. Isochronous Real-time interfaces may comprise any one or more of the c1, f1, m1, t1, a1 and e1 interfaces FIG. 15 also shows example interfaces of the SDM framework which may include:

- Control Interfaces (c1, f1): f1 is an optional interface since high specialized Industrial Devices 406 can implement the fine control instead of using the one provided by the controller. The Coarse and Fine Control Protocol (CFCP) is the protocol used in these interfaces.
- Discovery interfaces (d1): These interfaces are used by the Controller to discover the capabilities of the Industrial Devices 406. d1 interfaces also are used to forward Industrial Device 406 capabilities from the Controller 718 to the Planner 710.
- Motion/Path Command Interfaces (m1): The controller uses m1 interfaces to send motion or path commands to the Industrial Devices 406.
- Planning interfaces (p1): The Planner sends plan files to the other functional blocks through interface p1. Plan files can be, for example, control plan, motion plan or task plan.
- w1: It is an interface to communicate with the IoT Cloud, generally an interface running a protocol based on TCP/IP interface such as MQTT protocol or REST.
- Time Reference Interface (t1): Through t1 interfaces, the SDM function blocks can keep their clocks synchronized and perform IRT communications.
- Supervision events (e1): These interfaces are used by the planner, controller and PTP server to send events to the supervisor.
- Network MUTEX Interface (a1): a1 interfaces are used to create, destroy, lock and unlock network MUTEXes used by control tasks.
- Position interfaces (l1): These interfaces are used to transfer position information such as spatial coordinates of mobile Industrial Devices 406.
- Scheduler interfaces (s1): The scheduler uses s1 interfaces to create functional blocks for MPIs.

The following paragraphs with describe Manufacturing Process Instances in greater detail.

The SDM executes a manufacturing process (MP) in an MPI. An MPI couples a processing cell (PC) to an MP. A unique MP can run in multiple MPIs. Each MPI is associated with different PCs and producing a copy of the specified output for the order in the MP specification.

Figure 16:
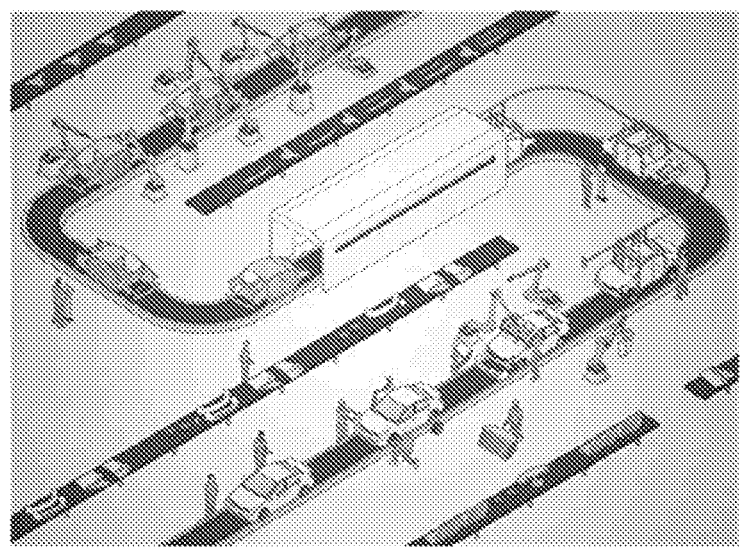
FIG. 16 is a diagram illustrating an example assembly line.

FIG. 16 shows an auto assembly line as an example realization of an MPI. An MPI can have several Industrial Devices 406 collaborating to satisfy an order.

Each MPI is made up of functional blocks including Controller, Supervisor and industrial devices, with instruction from the Planner and Scheduler.

The Planner is responsible for taking manufacturing orders and generate manufacturing processes which are specified with plans. The planning of a manufacturing process may involve any one or more of the following types of planning:

- TMP Plan: including Task plan, Motion plan and Path plan
- Mobility plan
- Control Plan
- Supervision plan
- Calibration plan In order to achieve goals of a manufacturing step like drilling holes in a part, moving a part from the conveyor belt to an autonomous vehicle, Industrial Devices 406 such as Industrial Device 406 arms need to be able to carry out high-level task planning in conjunction with low-level motion planning. Task planning is needed to determine long-term strategies such as whether to stop the conveyor belt to grab the part to put in the autonomous vehicle. The motion planning is required for computing the actual movements that the Industrial Device 406 should carry out.

The Industrial Device 406s field has traditionally treated task planning and motion planning in isolation. However, this separation can be problematic. Instead, Task-Motion Planning (TMP) is being proposed for use to tightly couple task planning and motion planning, to thereby produce a sequence of steps that can actually be executed by a real Industrial Device 406 to bring it from an initial to a final state.

Embodiments of SDM may support either on or both approaches:

Separated Task and Motion Plans.

TMP Plan containing a tightly coupled task and motion planning.

A mobility plan describes how a mobile Industrial Device 406 travels inside an MPI and/or outside to cross to another MPI. The path followed by a mobile Industrial Device 406 can include the Industrial Device 406 being added and removed to different processing cells such as MC or MPI during its running. Therefore, a mobility plan may include either one or both of:

Cellular plan: Includes security and configuration parameters for Industrial Device 406 connection to the cellular cells and cellular handover parameters.

Path description: It describes the route to be followed by the Industrial Device 406. It may include getting a map of the area under interest/manufacturing hub, plans for the optimum paths for the Industrial Devices 406 and parameters for optimizing the paths as new obstacles are encountered.

A control plan contains the configuration of each fine control and the coarse control plan of the streamline.

A supervision plan contains specifications for at least one of:

Event handling: Controllers can generate events such as alarms. These alarms are handled by the MPI supervisor which can include event filtering, event forwarding to the IoT Cloud or request the Controller to execute an action such as shut downing the whole MPI.

Quality Assurance (QA): The order can describe desirable QA parameters which can be included by the Planner in the Supervision Plan. The Supervisor may monitor these parameters which may generate events to show discrepancy during the manufacturing of the order by the MPI.

A Calibration Plan involves performing the initial calibration of the various sensors in the Industrial Devices 406 in the manufacturing plant in order to aid in obtaining accurate sensor and meter values for the coarse and fine controllers.

The Scheduler 714 may be responsible for one or more of:

Creating, starting and stopping of manufacturing process instances

Allocate resources to manufacturing process instances

Intra-Handover of mobile Industrial Devices 406 between Manufacturing Cells (MCs) allocated to the same Manufacturing Process Instance (MPI)

Inter-Handover of mobile Industrial Devices 406 between Manufacturing Cells (MCs) allocated to different Manufacturing Process Instances (MPIs)

The Controller 718 controls the execution of the plans which might include motion, calibration, and control plans.

Figure 17:
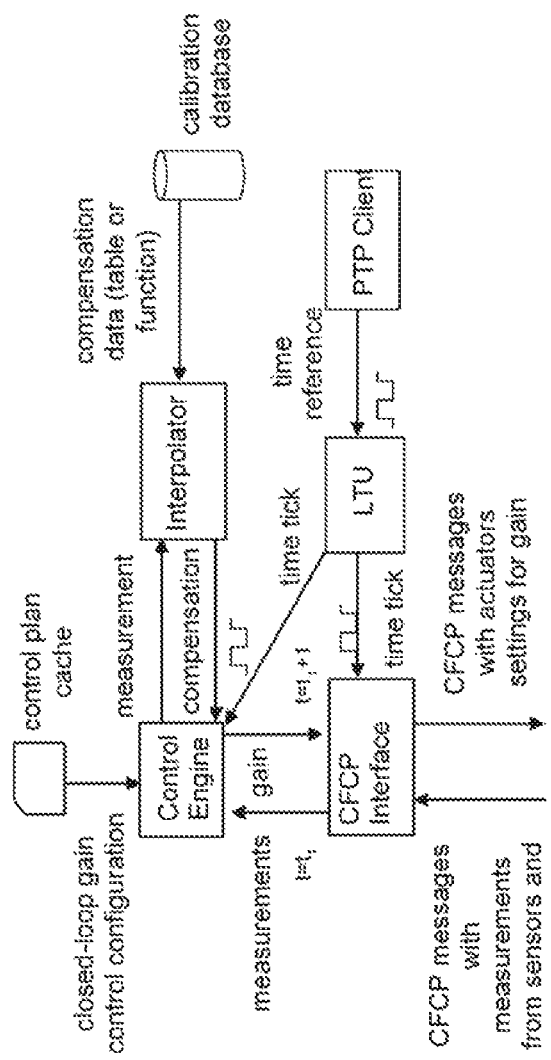
FIG. 17 is a block diagram illustrating an example functional subblocks of the controller of FIG. 7.

Example functional subblocks of the Controller are illustrated in FIG. 17, and are described below:

Control Engine: For every tick of the time reference, it receives the measurements, calculates the new gain value to compensate for the errors detected in the measurements. The new gain values are calculated according to the algorithm that implements the closed-loop gain control type, as described previously, for the Industrial Device 406 (coarse control) or for the actuator in the Industrial Device 406 (fine control).

Interpolator: The calibration data is generally defined in tables. In this case, a measured value rarely has a corresponding row in the calibration table. Thus, the calibration table and the measurement data are sent to Interpolator. The Interpolator executes a pre-defined interpolation function to calculate the compensation value for the Control Engine.

CFCP Interface: It gets CFCP messages from the network and makes this content available to the Control Engine and vice-versa.

Local Time Unit (LTU): LTU signals synchronization time ticks to Control Engine and CFCP Interface which starts a new control interaction.

PTP Client: The Precision Time Protocol (PTP) Client supplies LTU with synchronization time references.

Calibration Database: it contains the calibration data which is used to find the calibrated value corresponding to a measured value to be used by the Interpolator. The comparison between the calibrated value and the measured value results in an error which Control Engine uses to generate a gain value to correct the actuator.

Control Plan Cache: It contains the control plans for each closed-loop gain control sent by the Planner to Control Engine.

As described above, the Supervisor 716 handles or reacts to synchronous and asynchronous events originated inside the framework as alarms from controllers of manufacturing processes or alarms resulting from monitoring determined properties of the manufacturing processes.

Every supervision plan sent to the supervisor 716 by the planner 710 triggers a new action that might include starting agents for monitoring QA parameters, adding event filters, adding event forwarders, creating scripts to execute actions to handle events.

The foregoing description discussed high-level architecture, functional blocks and interfaces for implementing SDM in accordance with embodiments of the present invention. The following description provides a context of how these can be used to solve Industry 4.0 challenges. The SDM may support the following use cases of changes in manufacturing cells and manufacturing processes which are not supported by current solutions.

Use Case of Industrial Device 406 Collaboration: The collaboration between Industrial Devices 406 as defined herein deals with several characteristics of Industrial Device 406 collaboration especially due to a combination of Industrial Devices 406 following motion plans and Industrial Devices 406 following path plans.

Streamline: A streamline models the flow of activities performed by Industrial Devices 406 to achieve a given goal such as:

Industrial Device 406 arm execution steps of the motion plan to manufacture a part. This streamline is called motion control streamline.

Move a mobile Industrial Device 406 from the start position to the end position in a path plan. This streamline is called path control streamline.

Tasks: A task is a set of computation procedures performed, periodically or not. Examples of tasks are Linux threads and Linux processes. Real-time tasks are guaranteed to be started before a due-time in a concurrent operating system. A streamline may contain any one or more of the following real-time tasks:

Fine CLGC task: A task that executes loops of a CLGC algorithm for a fine controller. Each iteration of the CLGC algorithm or loop has a due time to be completed. Therefore, fine CLGC tasks must be implemented as real-time tasks in real-time operating systems.

Coarse CLGC task: A task that executes loops a CLGC algorithm implementation for a coarse controller, which is responsible for the operation of coarse control. Each iteration of the CLGC algorithm or loop has a due time to be completed. Therefore, coarse CLGC tasks must be implemented as real-time tasks in real-time operating systems.

Motion control: A task that executes one or more steps of a motion plan.

Each move of the motion may have a due time to completed. Therefore, motion control tasks may be implemented as real-time tasks in real-time operating systems. Each move of the motion may have a due time to completed. Therefore, motion control tasks may be implemented as real-time tasks in real-time operating systems.

Path control: A task that executes one or more steps of a path plan. Each move of the path may have a due time to completed. Therefore, path control tasks may be implemented as real-time tasks in real-time operating systems. Each move of the path may have a due time to completed. Therefore, path control tasks may be implemented as real-time tasks in real-time operating systems.

Task ID: A unique task ID may be associated with a task when it is created. This task ID can be used by a MUTEX server or MUTEX client to identify the current owner of a MUTEX.

MUTEXes: Sometimes Industrial Devices 406 need exclusive access to shared resources such as a manufactured part for Industrial Device 406 arms or access corridor in a floor for an autonomous vehicle. These types of accesses need to be coordinated so that the Industrial Devices 406 do not interfere with each other or generate collisions. This exclusive access can be implicitly programmed in the TMP or mobility plans. However, these plans are very hard to be done within the complex manufacturing process, some are probabilistically guaranteed to be found by an algorithm and some are prototyped using off-line programming [4].

For the cases that a plan is not found or to provide extra protection against collisions, SDM provides mutual exclusive objects, or MUTEXes. When using a resource protected by a MUTEX, the Industrial Devices 406 need to own the MUTEX before accessing that resource. This guarantees that only one Controller 718 or one Industrial Device 406 can access the resource at any given time, and so helps to prevent collisions. Industrial Devices 406 that want to access the resource while it is being accessed by another Industrial Device 406 will wait in a MUTEX queue. Once an Industrial Device 406 finishes its access, it frees the MUTEX and the next Industrial Device 406 in the MUTEX queue can have access.

Control tasks defined in SDM are typically real-time. Therefore, the isochronous real-time communication with low latency, low jitter and high reliability must be used to implement network MUTEXes. These requirements are typical of Time Sensitive Networks (TSN).

MUTEXes have a MUTEX ID and owner associated to them:

MUTEX ID: A MUTEX ID is used to identify a MUTEX in every MUTEX operation except for the MUTEX creation.

Owner: A MUTEX has an active owner associated with the MUTEX that is the ID of the task with the exclusive access to the resource protected by the task.

Each manufacturing process instance (MPI) has an interface to MUTEX server 720 or a MUTEX area where MUTEXes can be created, maintained and destroyed. Streamline tasks can access a MUTEX in this area through the naming services.

Since tasks in a streamline can run in different network devices, MUTEXes may be created, accessed and destroyed through a network protocol. The network protocol may have the following synchronous messages:

Create: it creates a MUTEX and returns its MUTEX ID. The MUTEX ID is available to be searched by the naming service of the SDM.

Lock: It can be used by a task to request an exclusive MUTEX. After the message confirmation, the task owns the MUTEX. The MUTEX exclusive access is only available to the owner task of the MUTEX.

Unlock: It can be used by a task to free an exclusive MUTEX. After the message confirmation, the task does not own the MUTEX. The MUTEX is freed so that the exclusive access can be acquired by any other task.

Destroy: It can be used by a task to request the destruction of a MUTEX. After the message confirmation, the MUTEX is not more available.

The MUTEX protocol should preferably use a real-time isochronous protocol with very low latency and reliability communications.

Figure 18:
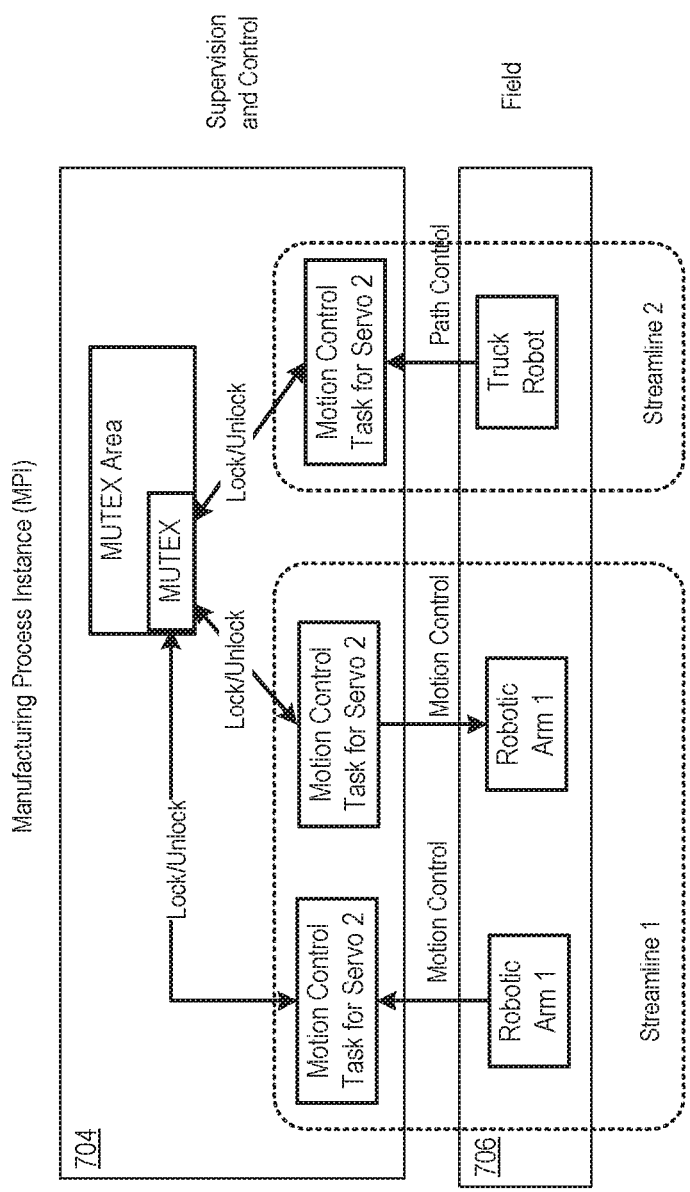
FIG. 18 is a block diagram illustrating an example MUTEX use case.
Figure 19:
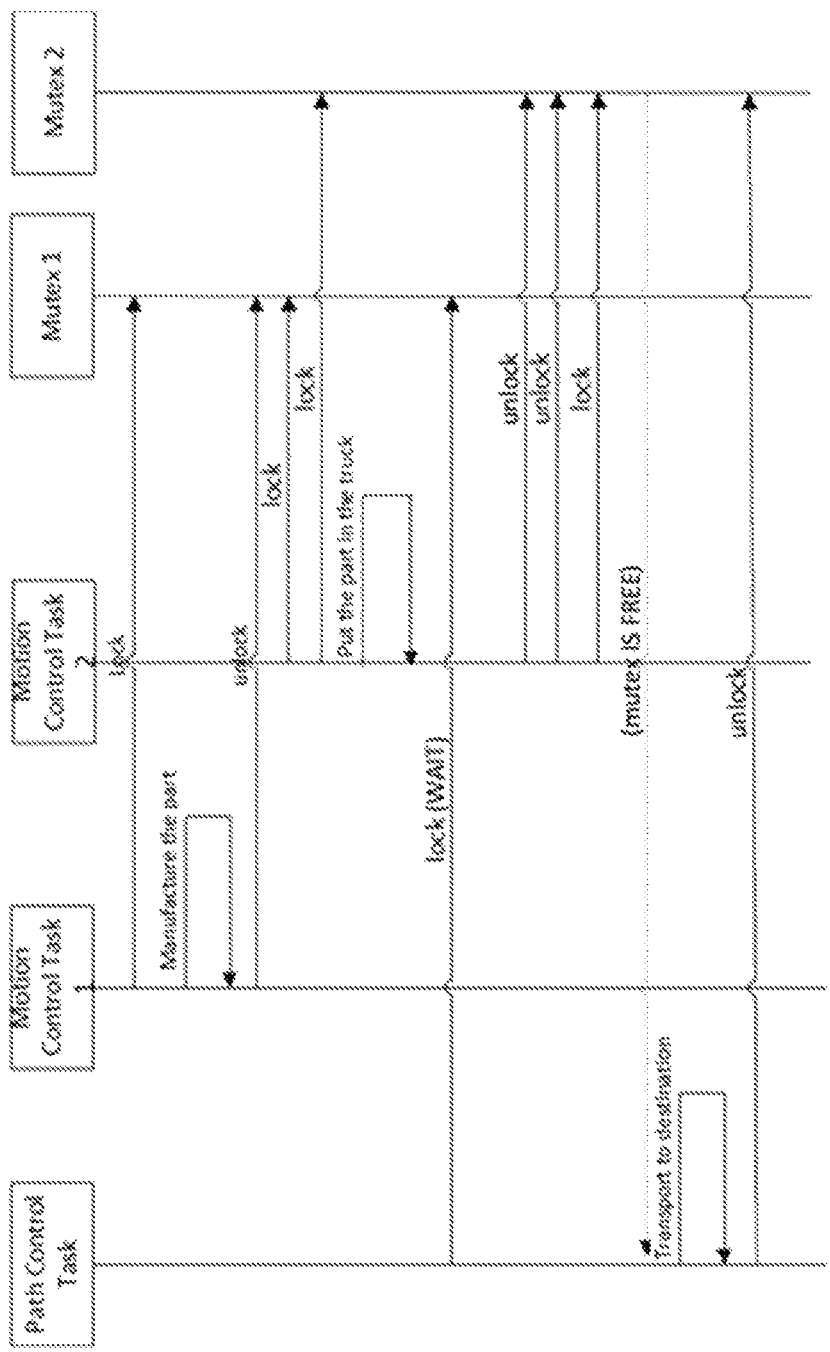
FIG. 19 is a message flow diagram illustrating an example process for locking and unlocking MUTEXes in the example use case of FIG. 18.

FIG. 18 illustrates an example in which two MUTEXes are used to protect access to a manufactured part in an MPI, and access to an autonomous vehicle. In this example, The TMP plan for streamline 1 defines two motion control tasks. The first motion control task controls the Industrial Device 406 arm 1 which does some manufacturing task on the part. The second motion control task controls the second Industrial Device 406 arm which grabs the part and put it inside the autonomous vehicle. Once the part is inside the autonomous vehicle, the autonomous vehicle will delivery to the destination which is done by the path control task defined in the path plan. FIG. 19 shows an example sequence of lock and unlock operations done by all three tasks to coordinate the whole manufacturing process from starting to manufacture the part to transporting it to the destination.

Use Case of Adaptive Adjustment by Industrial Device 406 Control

Control Type. Control plans can define a fine control or a coarse control (see the definition in the background section).

Control Plan Specification and Generation. Control plans may be written using any of the IEC 61131-3 Programming Languages, if desired. The process of generating a control plan may be done through an automated process that takes orders and resources specifications from the Cell Processing database and generates the control plan using Structured Text, for example. The control plan may be made part of the Manufacturing Process which is defined by the planner.

Figure 20:
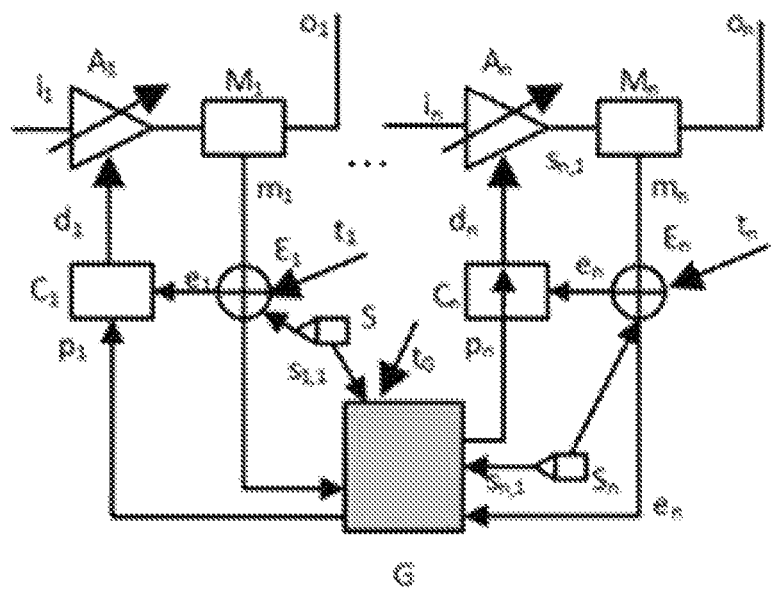
FIG. 20 is a block diagram illustrating an example parallel configuration of coarse and fine CLGC.
Figure 21:
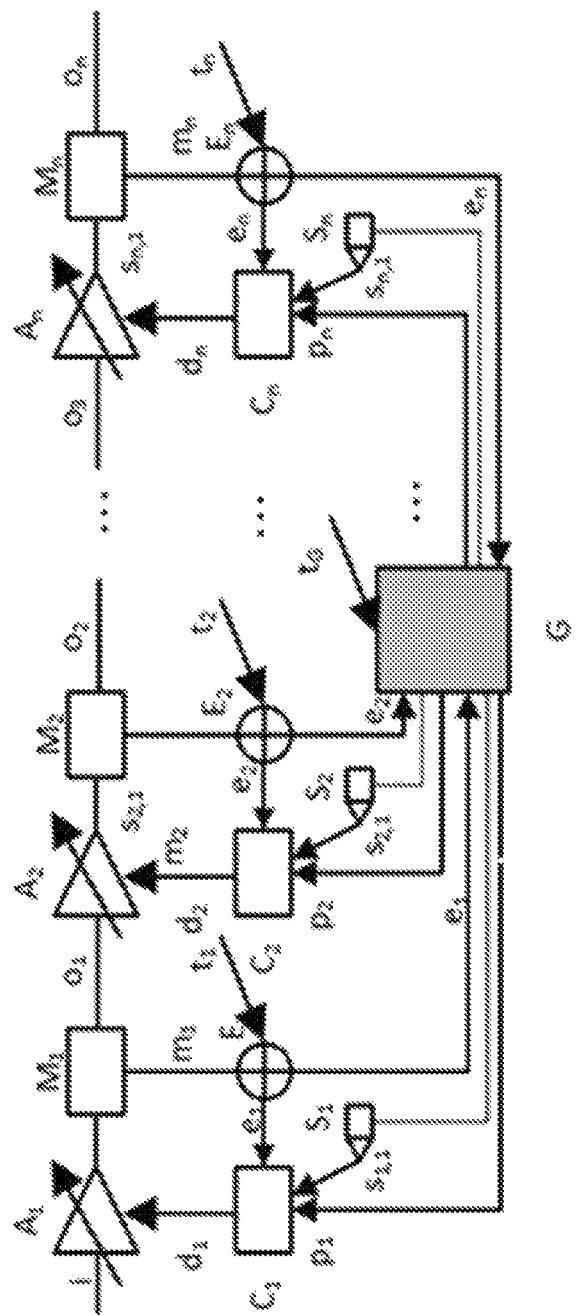
FIG. 21 is a block diagram illustrating an example serial configuration of coarse and fine CLGC.

Control Functional Blocks. The fine control and coarse control are the implementation of closed-loop controls. They are integrated in such a way that they work together with different time granularity of measurement and gain, to adjust one or more variables as described above. FIG. 20 illustrates the parallel configuration of the coarse/fine CLGC. In this configuration, the fine CLGC are independent of each other. The behavior of one loop does not affect the behavior of the other loops. FIG. 21 illustrates an example serial configuration of the coarse/fine CLGC. In a serial configuration, CLGC loops are cascaded. Thus, the behavior of any CLGC loop influences the behavior of the other CLGC loop.

In both configurations, the functional blocks are:

Variable Gain Processor (VGP) ($A_i$): Variable Gain Processor is the block that models the manufacturing process and the actuator controlling the process output. The VGP block takes two signals, input signal i for the first VGP or $o_i$ for the other VGPs, and the correction signal ($d_i$) to apply the function $A_i$. The result is the output signal $o_i$.

Fine Controller ($C_i$): It is the functional block that calculates the correction ($d_i$) to be applied to VGP $A_i$ for $o_i$.

Summers ($E_i$): Summers are devices that compare the outputs of meters $m_i$ with a predefined desired valued $t_i$. The difference $e_i=(t_i-m_i)$ is denominated the error signal.

Meters ($M_i$): Meters are devices that measure the output signal given the measured signals $m_i$.

Coarse Controller (G): It is the controller for the coarse control. It takes the errors $e_i$ from Summers.

Sensors ($S_{i,j}$) Sensor j is connected to controller $C_i$.

Functional blocks exchange the following signals:

Input signals (i): the input signal that is applied to the VGP in the Industrial Device 406 which results in a change in the property $o_i$.

Output signals ($o_i$): it is value resulting from VGP's action.

Measured output signals ($m_i$): It is the measured value by $M_i$ for the output signal $o_i$.

Target values ($t_i$) and ($t_G$): it is the desired value or the set point for $o_i$. The coarse controller has the corresponding Target value $t_G$.

Error signals ($e_i$): It is the difference $e_i=(t_i-m_i)$

Correction signal for fine control ($d_i$): it is input for the $A_i$ resulted from the controller $C_i$.

Sensor signals ($s_i$): It is the signal measured from the environmental sensor $S_i$.

Correction signal for coarse control ($p_i$): it is input for the $A_i$ resulted from the Coarse Controller G.

For the Closed-loop Gain Control shown in FIG. 21, the following relations are valid:

$$o_i = A_i(o_{i-1}, d_i), \text{ for } 1 \leq i \leq n \text{ and } o_1 = i.$$

$$d_i = C_i(e_i, p_i, s_i, \ldots, s_j)$$

where j is the number of sensors connected to $C_i$ and $1 \leq i \leq n$.

$$e_i = t_i - m_i, \text{ for } 1 \leq i \leq n.$$

$$[p_1, p_2, \ldots, p_n] = G(e_1, e_2, \ldots, e_n, s_1, s_2, \ldots, s_Z)$$

where Z is the number of sensors connected to G.

Fine control happens in the fine controller ($C_i$). Each controller $C_i$ is independent of the others and generates the control signal $d_i$ given by $d_i(t) = C_i(e_i(t), p_i(t), s_{i,1}(t), \ldots, s_{i,m}(t))$, where m is the number of sensors connected to $C_i$.

$C_i$ is typically an Industrial Device specific function, but the Industrial Device controller can supply a fine controller based on any control function such as one of the previously defined types of controller. For example, a Proportional Plus Integral (PI) controller is defined by making the following mapping:

$$mv(t) \leftarrow d_i(t), e(t) \leftarrow e_i(t), b \leftarrow \varphi_i(s_{i,1}(t), \ldots, s_{i,m}(t)) + p_i(t))$$

$$d_i(t) = K_c \left[ e_i(t) + \frac{1}{\tau_I} \int_0^t e_i(t) dt \right] + \varphi_i(s_{i,1}(t), \ldots, s_{i,m}(t)) + p_i(t)$$

where:

$\varphi_i$ is a function that compensates for environmental parameters sensed by the sensors.

For example, a VGP $A_i$ can control the rear wheel speed of an autonomous car to keep it constant. The corresponding meter $M_i$ can sense the speed has deviated and the car will have to accelerate. The corresponding $e_i$ can give an initial correction $d_i$ in terms of acceleration increase. However, the floor can be slippery which is sensed by a traction sensor installed in the wheels. A corresponding function ($p_i$ can negatively feedback $C_i$ to avoid the full speed increase giving by $d_i$. Other examples of $\theta_i$ can model control for temperature, frequency, and humidity.

Fine Controller Implemented in the Industrial Device 406. When the fine controller is implemented in an Industrial Device 406 controlled by the Industrial Device Controller through CFCP protocol, closed-loop gain control capability request messages are sent by the Industrial Device Controller to the fine controller which replies with the confirmation of the capability, that is, the capability is allocated by the fine controller in the Industrial Device 406 controlled by the Industrial Device Controller.

Fine Controller Implemented in the Industrial Device Controller. The fine controller can be implemented in the Industrial Device Controller to control a VGP implemented at the Industrial Device 406 having feedback signal from meters close to the Industrial Device 406 and environmental sensors. The fine controller at Industrial Device Controller can discover the capabilities of VGP, meter, and sensor characteristics through the CFCP capability negotiation messages for VPG, meters and sensors respectively.

Coarse Control. Coarse control happens in the coarse controller (G). The general control function G combines all the errors $e_i$ and data from m sensors $s_i$ to generate a control vector $[p_1, p_2, \ldots, p_n]$. Each element in this vector is a control value $p_i$ which is applied together with $d_i$ to the fine controller $C_i$. Therefore, G is a composition of closed control gain loop controllers, each controller generating a signal $p_i$. Such an individual controller can be from one of the controller types defined above. For example, global control can be composed of a series of n integral controllers using the following mapping:

$$mv(t) \leftarrow p_i(t), e(t) \leftarrow \varepsilon_i(s_{i,1}(t), \ldots, s_{i,m}(t)), mv(t_0) \leftarrow \omega_i(s_{i,1}(t), \ldots, s_{i,m}(t))$$

$$p_i(t) = K_c \left[ \omega_i(s_{i,1}(t), \ldots, s_{i,m}(t)) + \frac{1}{\tau_I} \int_0^t \omega_i(s_{i,1}(t), \ldots, s_{i,m}(t)) dt \right] +$$

$$\omega_i(s_{i,1}(t), \ldots, s_{i,m}(t))$$

where:

$\varepsilon_i = H_i - e_i$: this is the difference between the coarse error threshold $H_i$ and the error $e_i$. $\varphi_i$ is a function that compensates for environmental parameters sensed by the sensors in the global controller block.

Coarse and Fine Control Protocol (CFCP). The Coarse and Fine Control Protocol (CFCP) may be a peer-to-peer client/server protocol. It may be provided as an application layer transport protocol designed specifically to transport packet data from/to devices controlled by the CLGC controller to/from the CLGC controller:

VGP: Variable Gain Processor: a device that receives commands from the CLGC controller and modifies some property of the manufacturing process to adjust its output.

Meters: specialized sensors responsible to take samples of the manufacturing process output to feedback to the CLGC controller.

Sensors: specialized sensors that samples of some properties of the manufacturing process (not the output) or the environment around it and feedback to the CLGC controller.

Requirements of the CFCP may include any one or more of the following:

- Small packets for Real-Time Transmissions: CFCP packets for synchronous real-time and isochronous real-time transmissions should be very small to fit in few 4G/5G resources blocks without the need to spawn over several 4G/5G time slots (see the resource block allocation mechanism).
- Option to duplicate packets: Since the reliability requirements of IRT transmissions are very high, duplicating packets is a technique that can be used to increase the reliability of the network. This can be done automatically by the CFCP layer or activated by the CLGC controller.
- Support for negotiation of capabilities between devices and the controller.
- Agnostic to the supporting network.

For Real-time Transmission, CFCP packets should preferably use an average of two 4G resource blocks.

CFCP packets for non-real-time transmission: These packets are used for capability negotiation and association negotiation. There is no restriction to the size of the CFCP packet.

CFCP packet for synchronous real-time transmission: These packets are used for synchronous real-time transmissions. These packets should preferably fit in two LTE resource blocks on average.

CFCP packet for isochronous real-time transmission: These packets are used for isochronous real-time transmissions. These packets should preferably fit in two LTE resource blocks on average.

FINE AND COARSE CONTROL EXAMPLES

Example 1

Figure 22:
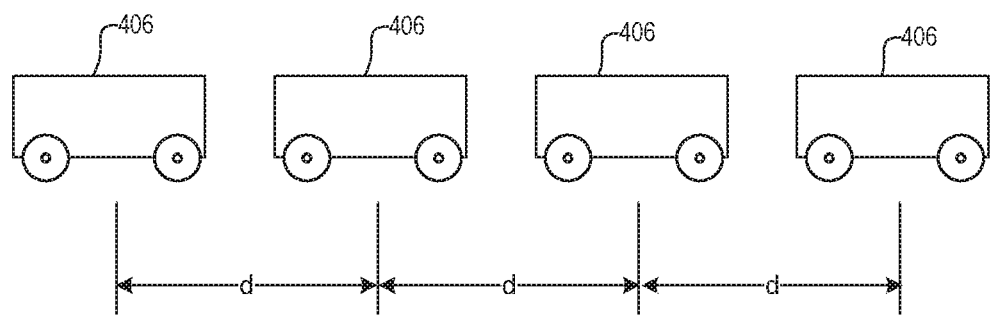
FIG. 22 is a diagram illustrating a line of autonomous vehicles.

FIG. 22 illustrates a line of autonomous vehicles 406 used to transport manufactured parts from a manufacturing process. The autonomous vehicles 406 follow one after another. They are separated by a variable distance (d), although the differences in the distances between autonomous vehicles are kept as minimal as possible.

Figure 23:
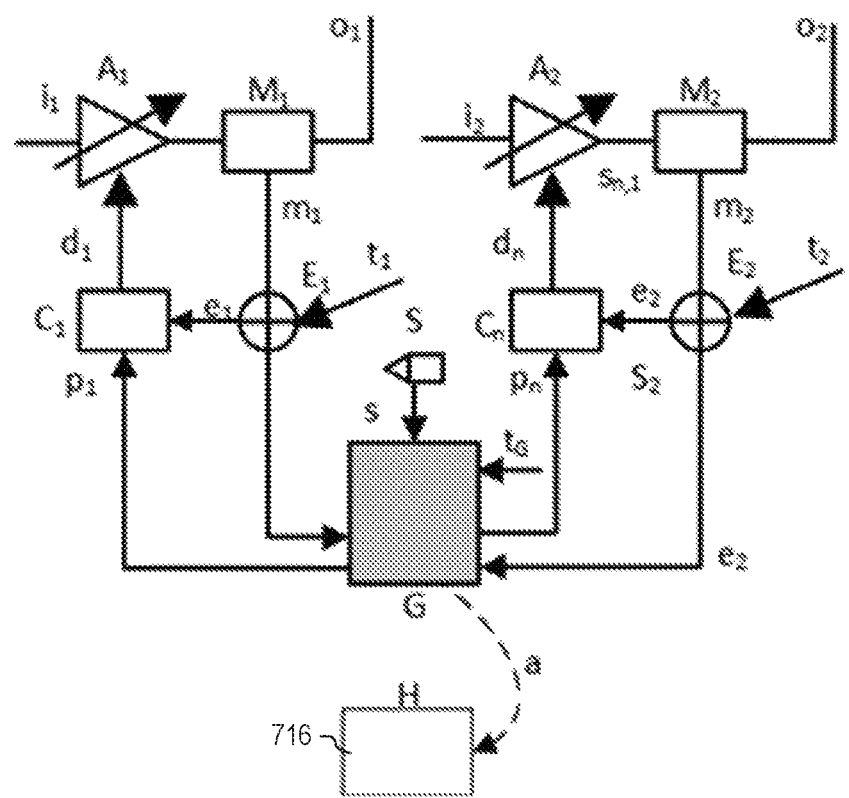
FIG. 23 is a block diagram illustrating control of electric motors of an autonomous vehicle modeled as a streamline.

Each autonomous vehicle 406 has two electrical motors. FIG. 23 illustrates the control of these motors of an autonomous vehicle 406 modelled as a streamline. The two motors are controlled by fine CLGC controllers ($C_1$ and $C_2$) that commands the rotation of each motor. The feedback signals for these two controllers come from the tachometers or encoders ($M_1$ and $M_2$). The distance between the autonomous vehicles is controlled by a coarse CLGC controller (G). The feedback signal for G comes from one of the proximity sensors (S) in each autonomous vehicle.

Assuming i indicates the motor (i=1 for the first motor and i=2 for the second motor), the labels in FIG. 23 have the following definitions:

- $A_i$: Actuator (PWM controller) for the motor i.
- $M_i$: tachometer for the motor i.
- $C_i$: fine CLGC controller for the motor i.
- S: proximity sensor between this autonomous vehicle and the next autonomous vehicle.
- $i_i$: electric current for the motor i.
- $t_i$: target speed for the motor i.
- $e_i$: error difference between the measured speed (derived from mi) and the target speed (ti) for the motor i.
- $o_i$: rotations for the motor i.
- $m_i$: rotations value for the motor i.
- $d_i$: increase in the PWM pulse for the motor i.
- $p_i$: compensation due to the proximity sensor.
- a: speed alarm.
- s: proximity value from sensor S.
- G: Coarse CLGC Controller.
- H: Supervisor A supervisor (H) receives events (speed alarms) from the coarse controllers in case it is not able to correct the errors.

Streamline 1:
CLGC Plan:

$$\partial_1 = \{A_1, M_1, C_1, A_1, i_1, o_1, t_1\}$$

The controller C1 is a PID controller defined by:

$$C_1 = \{K_c, \tau_I, \tau_d\}$$

Figure 24:
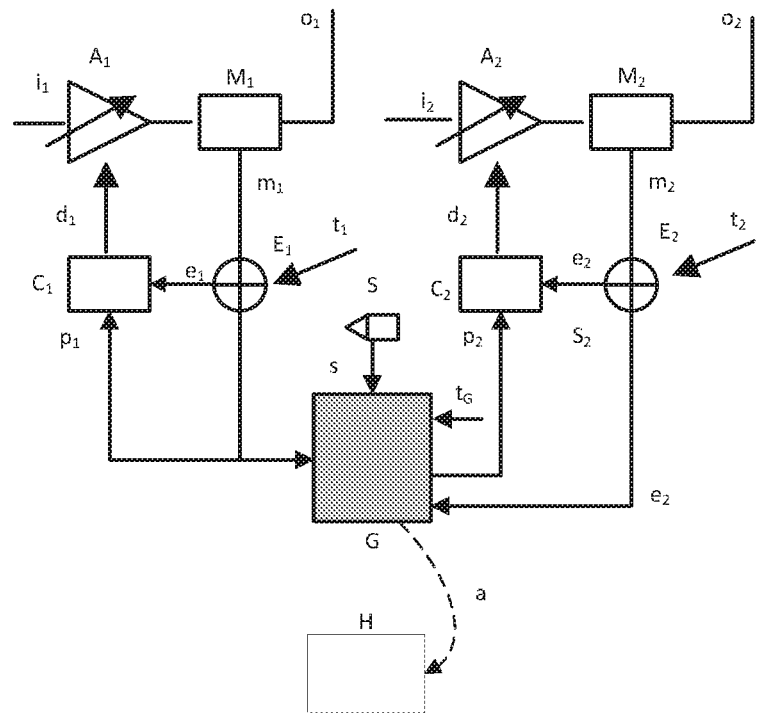
FIG. 24 is a block diagram illustrating control of steering servos of an autonomous vehicle to follow a path modeled as a streamline.

The two front wheels can turn by means of their wheel servos. They are controlled by the path controller that follows a path plan. FIG. 24 shows this path control modelled as a streamline. The two fine controllers ($C_1$ and $C_2$) control the angles of the wheels and the coarse control (G) controls the angle of the autonomous vehicle. These controllers receive the feedback signal from the meters ($M_1$ and $M_2$) that measures that angle with a fixed reference such as the middle border of the lane (yellow line of the road) or the curb line of the road.

Assuming i indicates the wheel (i=1 for the first wheel and i=2 for the second wheel), the labels in FIG. 24 have the following definitions:

- $A_i$: actuator (PWM controller) for the wheel servo i.
- $M_i$: angle reader for the wheel i.
- $C_i$: fine CLGC controller for the wheel i.
- S: sensor of the angle between this autonomous vehicle and the line of reference.
- $i_i$: Electric current for the wheel servo i.
- $t_i$: target angle for the wheel i.
- $o_i$: angle for the wheel i.
- $m_i$: angle for the wheel i.
- $d_i$: increase in the PWM pulse for the wheel servo i
- $p_i$: compensation due to the autonomous vehicle's angle sensor (S).
- a: angle alarm.
- s: autonomous vehicle's angle.
- G: Coarse CLGC Controller.
- H: Supervisor Supervision Plan:

$$\gamma_2 = \{M, a\}$$

Example 2

This example illustrates a case where the streamlines are cascaded in a sequence. The output of a streamline is the input of the next streamline, unless it is the last streamline in the sequence. The output of the last streamline is the output of the streamline sequence.

Figure 25:
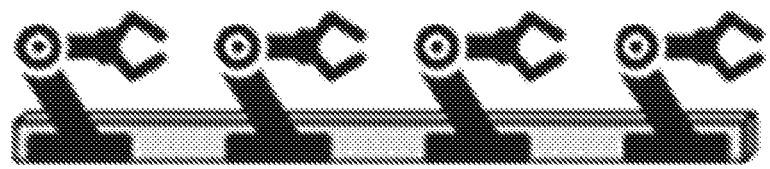
FIG. 25 is a diagram illustrating an assembly line.

FIG. 25 illustrates an example of an assembly line. The assembly line contains four Industrial Device 406 arms. The Industrial Device 406 arms are placed along a line performing some manufacturing task in a part passing through the Industrial Devices 406. Each Industrial Device 406 has a determined time to due time the task. After the due time, the next Industrial Device 406 can start its task on the manufactured part being produced. To maintain the most efficient time alignment between the Industrial Devices 406, the streamline illustrated in FIG. 26 models the control for the servos in each Industrial Device 406 arm. The streamline contains four fine control loops in cascade, each controlling the speed of the servos and one coarse control loop with a coarse control of these speeds after some speed threshold.

Figure 26:
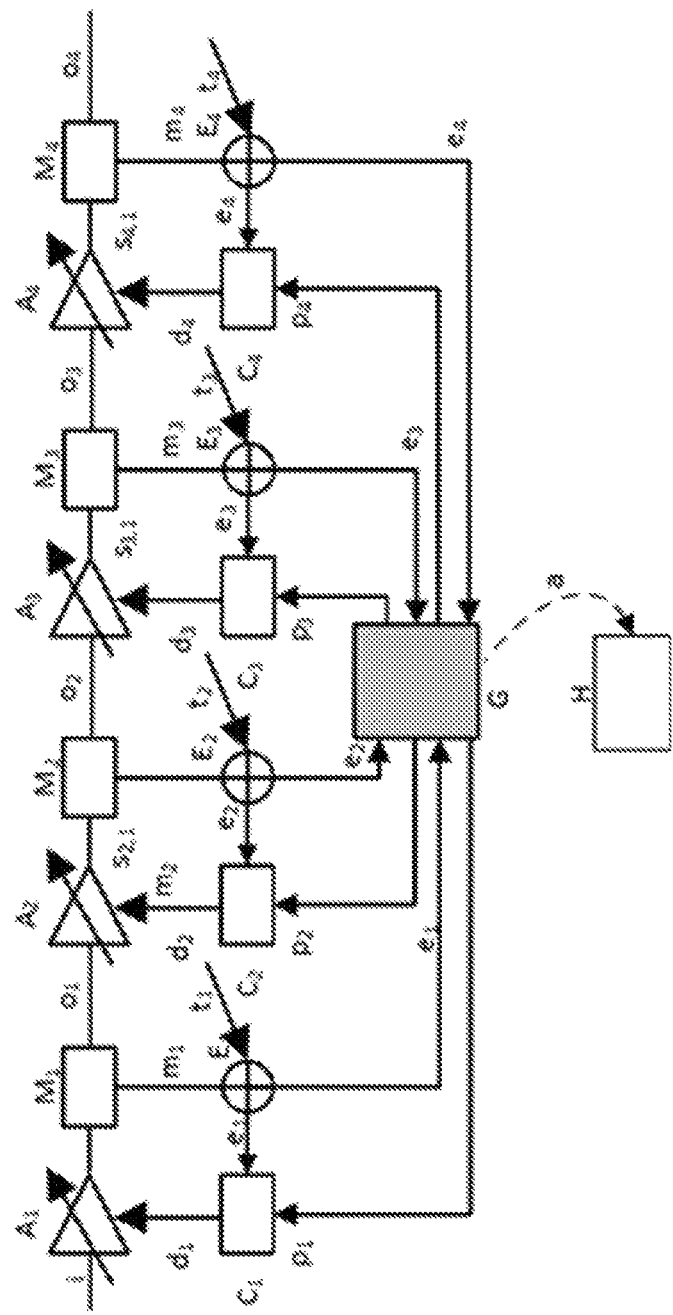
FIG. 26 is a block diagram illustrating control for the servos in each Industrial Device arm of the assembly line of FIG. 25.

Assuming i indicates the servo (i=1 for the first wheel and i=2 for the second wheel), the labels in FIG. 26 have the following definitions:

$A_i$: actuator (PWM controller) for the servo i.
$M_i$: tachometer for the servo i.
$C_i$: fine CLGC controller for the servo i.
$i_i$: Electric current for the servo i.
$t_i$: rotation target for servo i.
$o_i$: output rotation for servo i.
$m_i$: measure rotation for servo i.
$d_i$: adjust for the PWM pulse for the servo i
$p_i$: compensation for servo i due to coarse control.
a: alarm for the time alignment of the Industrial Device 406 control.
G: Coarse CLGC Controller.
H: Supervisor Use Case of Self-Healing and Quality Assurance with Industrial Device Supervision Supervision is the control with the largest response time. Supervision control permits a longer time interval than CLGC, taking actions to correct problems detected during the fine and coarse CLGC and cannot be corrected by varying the gain from VGPs.

Self-healing: The supervision is characterized by the self-healing property which is the supervision property to correct some defect or problem in the MPI following an abnormal manufacturing condition. The Supervision functional block monitors the control functions of the fine and coarse CLGC. Additionally, the supervision can monitor properties of environmental sensors in the MPI and it might raise alarms to IoT Cloud 708 or performing self-healing operations if pre-determined conditions are not met.

Control stability: It tells how often the output deviates from the target value.

Control convergence: it is the time in average for the PV to converge to PS (or very close to it).

On the event of some of these properties deviates from acceptable intervals, the supervisor triggers a self-healing action which will apply some pre-defined correction external to the control functional block such as:

Recalibration: Stopping the streamline and applying an Industrial Device 406 specific recalibration sequence or remapping the factory floor for autonomous vehicles.

Handover: A defected Industrial Device 406 in a streamline can be replaced by another Industrial Device 406 that is in good working condition. A task handover is performed from the defected Industrial Device 406 to the new Industrial Device 406 in the streamline.

Rerouting: Determining (forcing) a new route for an autonomous vehicle.

Maintenance service: Industrial Devices 406 can do periodically or on demand maintenance services such as replacing a tool in an arm Industrial Device 406 or replacing sensor or Industrial Device 406 batteries with new batteries.

Monitors for Quality Assurance

The manufacturing process may specify quality assurance control parameters which triggers the instantiation of supervision monitors for these parameters. Depending on the supervision plan these monitors can trigger events if the parameters are not met.

Quality Assurance by timely calibration. Before executing a manufacturing process, the MPI verifies the state of the processing cell to determine whether or not any calibration is required. If the PC needs calibration, the MPI moves to uncalibrated state and may start a calibration procedure for the processing cell during a maintenance window. It is costly to discover any defective product being manufactured and it is extremely costly to pause any ongoing manufacturing process because any unplanned interruption has monetary impact. In other words, the product value that can be manufactured during the stoppage is not able to realize.

Calibration Plan

A calibration plan may contain any one or more of:
Recommended calibration periodicity for each Industrial Device 406.
thresholds for process variables and environmental variables to trigger calibrations by the fine and coarse control tasks.
Expected calibration time.
Optionally calibration scripts to execute automatic calibration when supported by the Industrial Device 406. Otherwise, manual calibration may be done.
Calibration references for calibration such as:
A reference part to calibrate some process and environment variable such as time alignment, position alignment.
Tags for position references to calibrate position sensors.
Re-mapping of the industrial facility by a mapping autonomous Industrial Device 406.

Use Case of Production Scaling

Figure 27:
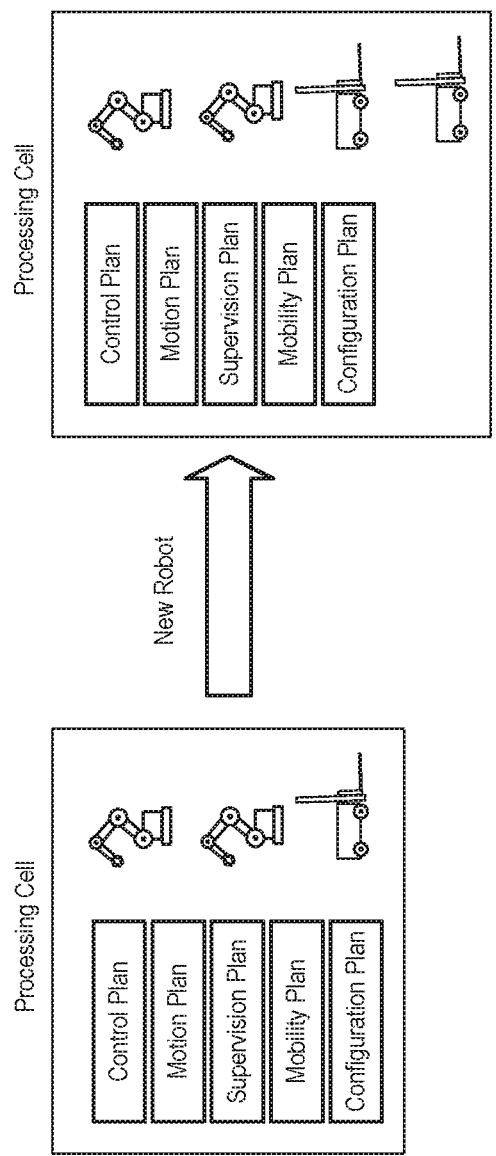
FIG. 27 is a block diagram illustrating an example of an SDM operation to increase production capacity of the assembly line of FIG. 25.

Production scaling: It is the increase or decrease by the software interface of the production of orders in a manufacturing process. FIG. 27 illustrates an example of an order to increase the production capacity. This action on SDM can be triggered by the SDM Planner or by a human operator through the SDM software interface.

Use Case of Failure Recovery on Industrial Device 406 Replacement

Figure 28:
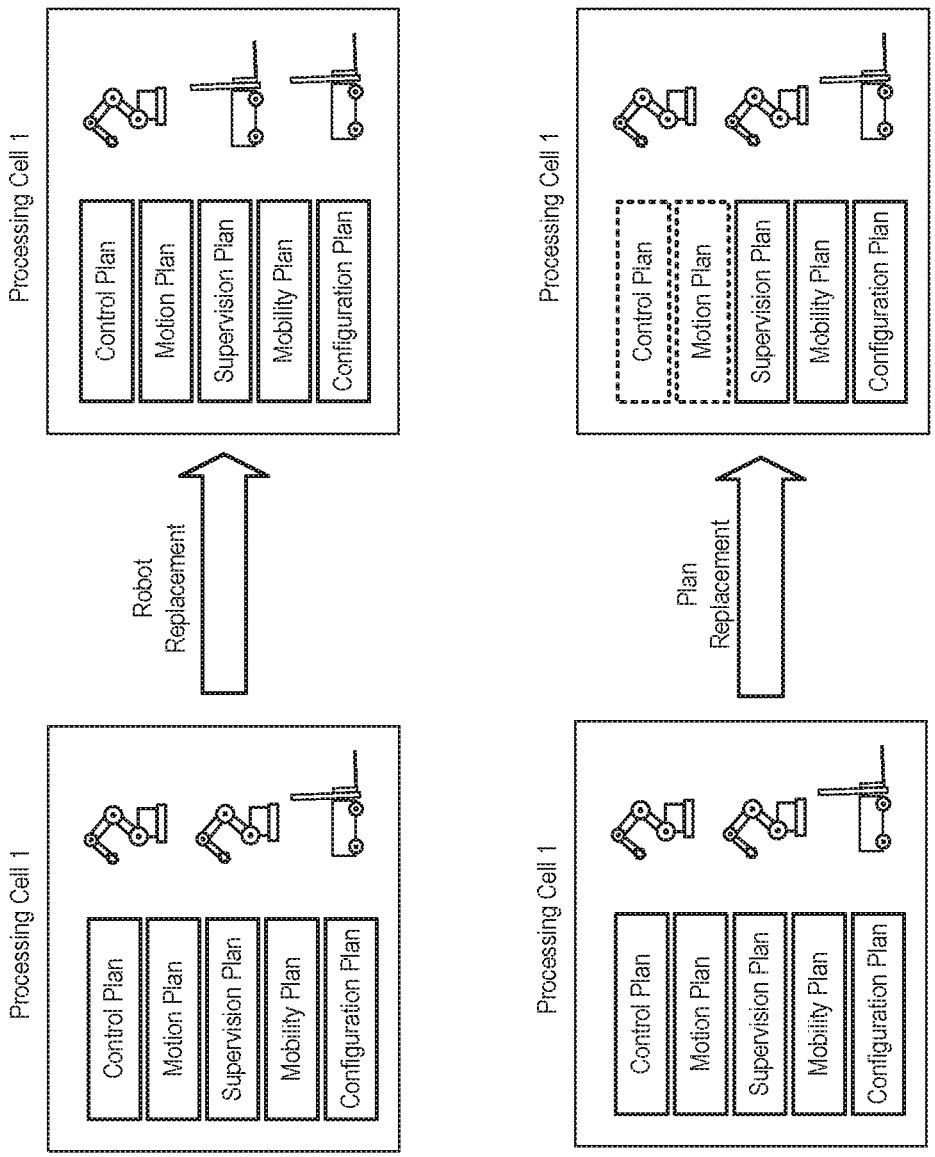
FIG. 28 is a block diagram illustrating an example of an SDM operation to replace an Industrial Device of the assembly line of FIG. 25.

Industrial Device 406 replacement: It is the maintenance action of replacement a defected Industrial Device 406 as shown in FIG. 28. This action can be triggered automatically through the SDM supervision or by a human operator through the software interface of the SDM.

Use Case of Order Adaptation by Industrial Device 406 Relocation

Figure 29:
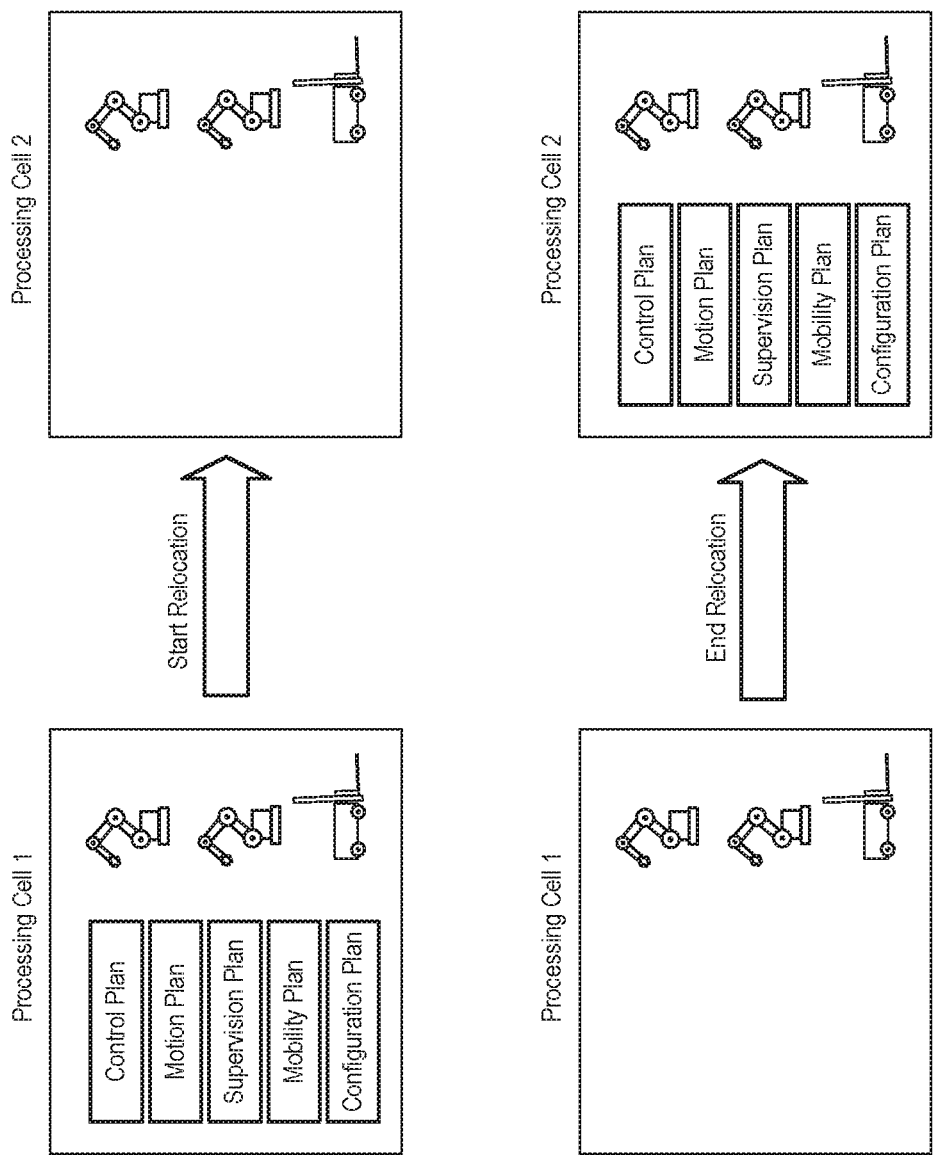
FIG. 29 is a block diagram illustrating an example of an SDM operation to relocate a manufacturing process within a facility.

Production Relocation: it is the physical relocation of a manufacturing process to a new area in a factory. This use case is illustrated in FIG. 29. This action can be triggered automatically through the SDM supervision, by the SDM Planner or by a human operator through the software interface of the SDM.

Figure 30:
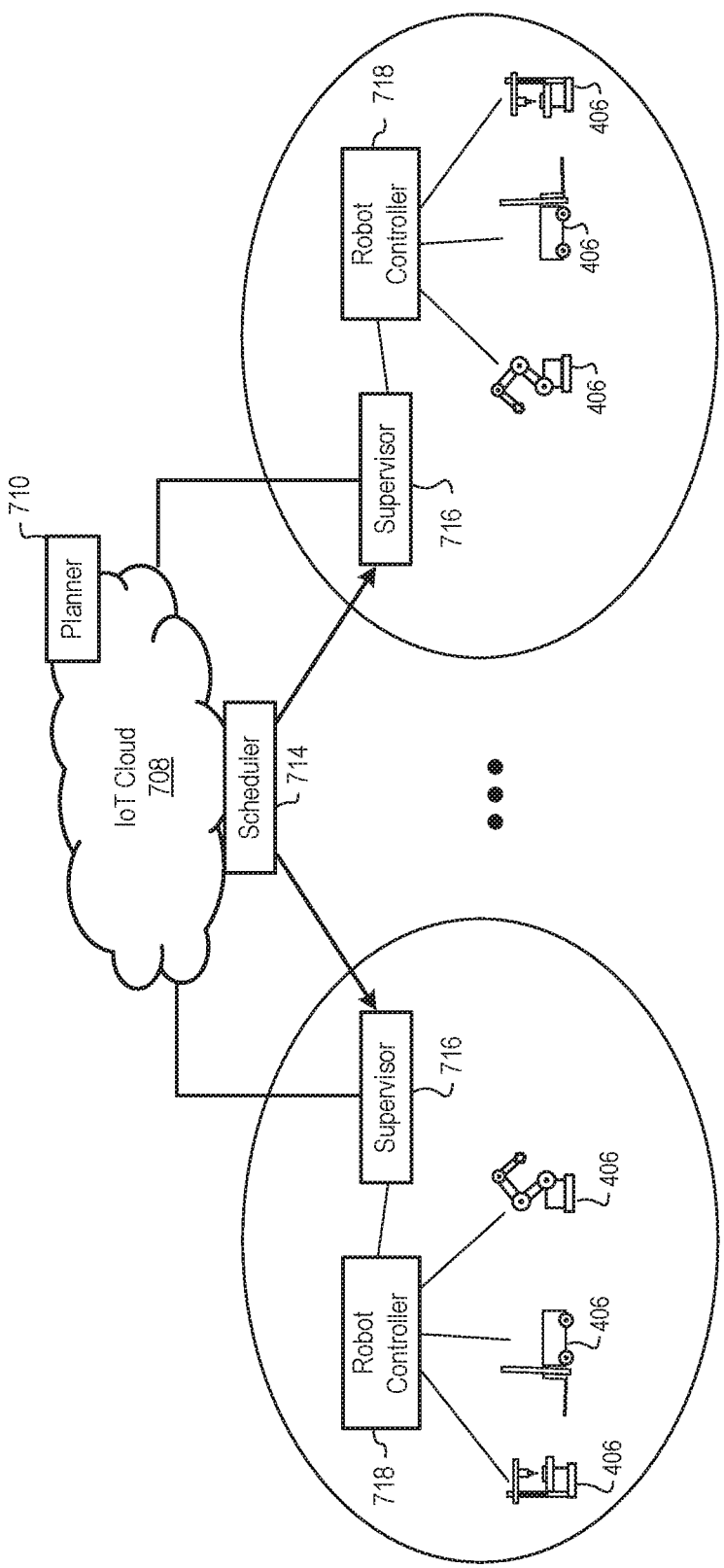
FIG. 30 is a block diagram illustrating an example of two SDMs connected to an IoT cloud in accordance with embodiments of the present invention.

FIG. 30 illustrates an example cloud-based deployment of Software Defined Manufacturing. The IoT cloud represents an information network implemented using cloud technologies. The IoT cloud implements several services such as manufacturing order dispatching, SDM health reporting, SDM management. The Planner is responsible for generating the manufacturing process definition, each streamline comprising a manufacturing process and its correlated plans (control plan, supervision plan, motion plan, transport plan) of the streamline. The planner also keeps the centralized database with physical resource definitions. The scheduler can be situated in the cloud and it dispatches instruction to the controller and supervisor.

The controller and supervisor can reside in the cloud as well if the real-time responses and closed-loop controls are not needed in the deployment. For this discussion, we assume they are edge computing and residing on the premise. The scheduler is responsible for instantiating the cells to produce the orders using the streamline definitions and the centralized resource database. The scheduler allocates Industrial Devices 406 and any other physical resources in a processing cell. It also operates the processing (start, pause, stop).

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A system comprising
a first base station of a cellular communications network serving at least a first cell of the cellular communications network and configured to wirelessly transmit and receive signals to and from industrial devices deployed within a manufacturing facility and located within any cell served by the first base station, wherein the first base station has ultra-reliable low latency communications (URLLC) capabilities; and
a computer system comprising:
an interface connected to transmit and receive signals to and from the first base station; and
processing circuitry configured to cause the computer system to:
use the interface to receive a request message requesting generation of a manufacturing process instance (MPI), the request message requesting the generation of the MPI comprising a manufacturing process specification identifying manufacturing operations necessary to perform a predetermined manufacturing process, the identified manufacturing operations comprising a first manufacturing operation;
after receiving the request message, determine whether there are sufficient resources available for the predetermined manufacturing process;
after determining that there are sufficient resources available for the predetermined manufacturing process, selecting resources to assign to the MPI, wherein the selected resources comprise a first resource, and the first resource is a first industrial device configured to perform at least the first identified manufacturing operation;
after selecting the first industrial device, assign to the MPI the first industrial device configured to perform at least the first identified manufacturing operation; and
implement a controller configured to control at least the first industrial device assigned to the MPI by performing a control process comprising:

transmitting a first command to the first industrial device assigned to the MPI;
receiving from the first industrial device a first reply responsive to the first command;
in response to receiving the first reply, selecting a second command based on the first reply;
transmitting the selected second command to the first industrial device; and
receiving from the first industrial device a second reply responsive to the second command.

2. The system of claim 1, wherein the selected resources comprise any one or more of:
industrial robots;
sensors;
actuators; and
machine controllers.

3. The system of claim 1, wherein the cellular communications network is isolated from a public land mobility network, PLMN, by any one or more of:
either one or both of an encryption protocol and at least one encryption key;
spatial separation; and
radio frequency shielding.

4. The system of claim 1, wherein selecting the first industrial device comprises determining whether the first industrial device is within the coverage of one or more particular cells of the cellular communications network, and the first industrial device is selected to be assigned to the MPI after it is determined that the first industrial device is within the coverage of at least one of the particular cells of the cellular communications network.

5. The system of claim 1, wherein at least one of the industrial devices assigned to the MPI is located within the first cell of the radio access network, and another one of the industrial devices assigned to the MPI is located within a second cell of the cellular communications network.

6. The system of claim 1, wherein the processing circuitry is further configured to implement a supervisor configured to monitor an operation of each of the industrial devices assigned to the MPI.

7. The system of claim 1, wherein the processing circuitry is further configured to implement a mutual exclusion (MUTEX) server configured to control access by the industrial devices assigned to the MPI to resources of the manufacturing facility that are shared with industrial equipment assigned to a different MPI.

8. The system of claim 1, wherein the processing circuitry is further configured to implement a position server configured to record a current position, within the manufacturing facility, of each of the industrial equipment assigned to the MPI.

9. The system of claim 1, wherein
the selected resources further comprise a second resource,
the second resource is a first communication channel, and
the computer system is further configured to assign to the MPI the first communication channel.

10. The system of claim 1, wherein
the first command is based at least in part on a specific manufacturing operation associated with the first industrial device.

11. The system of claim 10, wherein the second command signal-is based at least in part on: the specific manufacturing operation associated with the first industrial device and the first reply.

12. A method performed by a computer system, the method comprising:

receiving a request message requesting generation of a manufacturing process instance (MPI), wherein the request message requesting the generation of the MPI comprises a manufacturing process specification identifying manufacturing operations necessary to perform a predetermined manufacturing process, the identified manufacturing operations comprising a first manufacturing operation;

after receiving the request message, determining whether there are sufficient resources available for the predetermined manufacturing process;

after determining that there are sufficient resources available for the predetermined manufacturing process, selecting resources to assign to the MPI, wherein the selected resources comprise a first resource, and the first resource is a first industrial device configured to perform at least the first identified manufacturing operation;

after selecting the first industrial device, assigning to the MPI the selected first industrial device that is configured to perform at least the first identified manufacturing operation; and controlling at least the first industrial device assigned to the MPI by performing a control process comprising:
    transmitting a first command to the first industrial device assigned to the MPI;
    receiving from the first industrial device a first reply responsive to the first command;
    in response to receiving the first reply, selecting a second command based on the first reply responsive to the first command;
    transmitting the selected second command to the first industrial device; and
    receiving from the first industrial device a second reply responsive to the second command.

\* \* \* \* \*